US011148195B2

(12) United States Patent
Izawa et al.

(10) Patent No.: US 11,148,195 B2
(45) Date of Patent: Oct. 19, 2021

(54) LAMINATE, SLIDING MEMBER, AND METHOD FOR MANUFACTURING LAMINATE

(71) Applicants: NISSAN MOTOR CO., LTD., Yokohama (JP); FUKUDA METAL FOIL & POWDER CO., LTD., Kyoto (JP)

(72) Inventors: Yoshinori Izawa, Kanagawa (JP); Junichi Arai, Kanagawa (JP); Yutaka Mabuchi, Kanagawa (JP); Katsunori Otobe, Kyoto (JP); Shinichi Nishimura, Kyoto (JP)

(73) Assignees: NISSAN MOTOR CO., LTD., Yokohama (JP); FUKUDA METAL FOIL & POWDER CO., LTD., Kyoto (JP)

( * ) Notice: Subject to any disclaimer, the term of this patent is extended or adjusted under 35 U.S.C. 154(b) by 0 days.

(21) Appl. No.: 16/482,628

(22) PCT Filed: Feb. 2, 2018

(86) PCT No.: PCT/JP2018/003642
§ 371 (c)(1),
(2) Date: Jul. 31, 2019

(87) PCT Pub. No.: WO2018/143424
PCT Pub. Date: Aug. 9, 2018

(65) Prior Publication Data
US 2019/0344338 A1 Nov. 14, 2019

(30) Foreign Application Priority Data
Feb. 3, 2017 (JP) .............................. JP2017-018411

(51) Int. Cl.
B22F 7/04 (2006.01)
B22F 1/00 (2006.01)
B22F 9/08 (2006.01)
B32B 15/20 (2006.01)
(Continued)

(52) U.S. Cl.
CPC .............. *B22F 1/0003* (2013.01); *B22F 7/04* (2013.01); *B22F 9/08* (2013.01); *B32B 15/20* (2013.01);
(Continued)

(58) Field of Classification Search
None
See application file for complete search history.

(56) References Cited

U.S. PATENT DOCUMENTS 5,188,799 A  2/1993  Mori et al.
7,993,758 B2  8/2011  Wilhelm et al.
(Continued)

FOREIGN PATENT DOCUMENTS

CN  101285187 A  10/2008
DE  102007049383 A1 *  4/2009 ............. C22C 38/02
(Continued)

OTHER PUBLICATIONS

English language translation of DE102007049383A1 from EPO espacenet Jul. 4, 2020 (12 pages) (Year: 2020).*
(Continued)

*Primary Examiner* — Adam Krupicka
(74) *Attorney, Agent, or Firm* — Foley & Lardner LLP

(57) ABSTRACT

A laminate includes a base substrate, and a coating layer formed on the base substrate. The coating layer includes a copper alloy portions derived from precipitation-hardening copper alloy particles and hard particle portions which are harder than the copper alloy portions, the hard particle portions are derived from hard particles, and the parts bond with each other via an interface. Each of the hard particle portions has a non-spherical shape.

(Continued)

A sliding member includes the laminate in at least one sliding portion.

A method for manufacturing a laminate includes a step of spraying a mixture in a non-molten state including precipitation-hardening copper alloy particles and hard particles having a non-spherical shape and being harder than the copper alloy particles onto a base substrate, to form a coating layer on the base substrate.

19 Claims, 12 Drawing Sheets

(51) Int. Cl.
    *C22C 1/04*     (2006.01)
    *C22C 9/06*     (2006.01)
    *C22C 9/10*     (2006.01)
    *C23C 24/04*     (2006.01)

(52) U.S. Cl.
    CPC .................. *C22C 1/04* (2013.01); *C22C 9/06* (2013.01); *C22C 9/10* (2013.01); *C23C 24/04* (2013.01)

(56) References Cited

U.S. PATENT DOCUMENTS

| | | | |
|---|---|---|---|
| 2004/0161625 A1* | 8/2004 | Sakai | F16C 33/121 428/553 |
| 2006/0093736 A1 | 5/2006 | Raybould et al. | |
| 2015/0360311 A1* | 12/2015 | Zheng | C22C 33/0228 428/559 |
| 2018/0223902 A1 | 8/2018 | Izawa | |

FOREIGN PATENT DOCUMENTS

| | | |
|---|---|---|
| JP | 2007-270206 A | 10/2007 |
| JP | 2008-519157 | 6/2008 |
| JP | 5202024 B2 | 6/2013 |
| WO | WO-2006/050329 A1 | 5/2006 |
| WO | WO-2017/022505 A1 | 2/2017 |

OTHER PUBLICATIONS

Wang et al., Effects of Cr and Zr additions on microstructure and properties of Cu—Ni—Si alloys, Jul. 2016, Material Science & Engineering A, vol. 673, pp. 378-390. (Year: 2016).*

A. F. Sanin et al, Theory, Production Technology, And Properties Of Powders And Fibers, Effect Of Water Pressure On The Particle Shape Of Powder In Atomization, I. Heat Exchange In The Atomization Spray At High Energy Carrier Pressures, Sep. 30, 1988, XP055725939, Retrieved from the Internet: URL:https://link.springer.com/content/pdf/10.1007/BF00796219.PDF(retrieved on Aug. 28, 2020).

* cited by examiner

LAMINATE, SLIDING MEMBER, AND METHOD FOR MANUFACTURING LAMINATE

TECHNICAL FIELD

The present invention relates to a laminate, a sliding member, and a method for manufacturing a laminate.

BACKGROUND ART

Conventionally, Patent Document 1 discloses a method of forming a hard coating that enables forming a hard coating on a surface of a base substrate through deformation-induced transformation in a cold state. The method of forming the hard coating involves spraying metal powder in a solid state onto a surface of a base substrate along with compressed air as a medium, to form a hard metal coating. In this forming method, the metal powder is made of a metal material that can undergo deformation-induced transformation. The method involves spraying the metal powder onto the base substrate at such a high speed that causes deformation-induced transformation, to accumulate and layer the metal powder on the surface of the base substrate while plastically deforming the metal powder into a flat shape as well as to cause deformation-induced transformation of the metal powder that has been deposited. Accordingly, this forming method is characterized in that the metal coating formed on the base substrate is harder than the metal powder prior to being sprayed onto the base substrate.

CITATION LIST

Patent Document

Patent Document 1: JP 5202024B

SUMMARY OF INVENTION

Technical Problem

However, there has been a problem with the hard coating in Patent Document 1, as being insufficient in abrasion resistance.

The present invention was made in view of the problem with the prior art. It is an object of the present invention to provide a laminate having excellent abrasion resistance, a sliding member including a laminate in a sliding portion, and a method for manufacturing a laminate.

Solution to Problem

The present inventors conducted a keen study in order to achieve the above-described object. As a result, the present inventors found that the aforementioned object can be achieved by forming a coating layer on a base substrate, the coating layer having copper alloy portions derived from precipitation-hardening copper alloy particles and hard particle portions which are harder than the copper alloy portions, wherein each of the hard particle portions is derived from hard particles and each of the hard particle portions has a non-spherical shape, and the portions are bounded to each other via interfaces between the portions. The present invention has been thus completed.

Advantageous Effects of Invention

According to the present invention, it is possible to provide a laminate with excellent abrasion resistance, a sliding member including a laminate in a sliding portion, and a method for manufacturing a laminate.

DESCRIPTION OF EMBODIMENTS

Hereinafter, a laminate, a sliding member, and a method for manufacturing a laminate according to an embodiment of the present invention will be described in detail.

First Embodiment

First, a laminate according to a first embodiment of the present invention will be described in detail, with reference to the drawings. The dimensions of the drawings referred to in the following embodiments are exaggerated for descriptive reasons and may be different from the actual dimensions.

Figure 1:
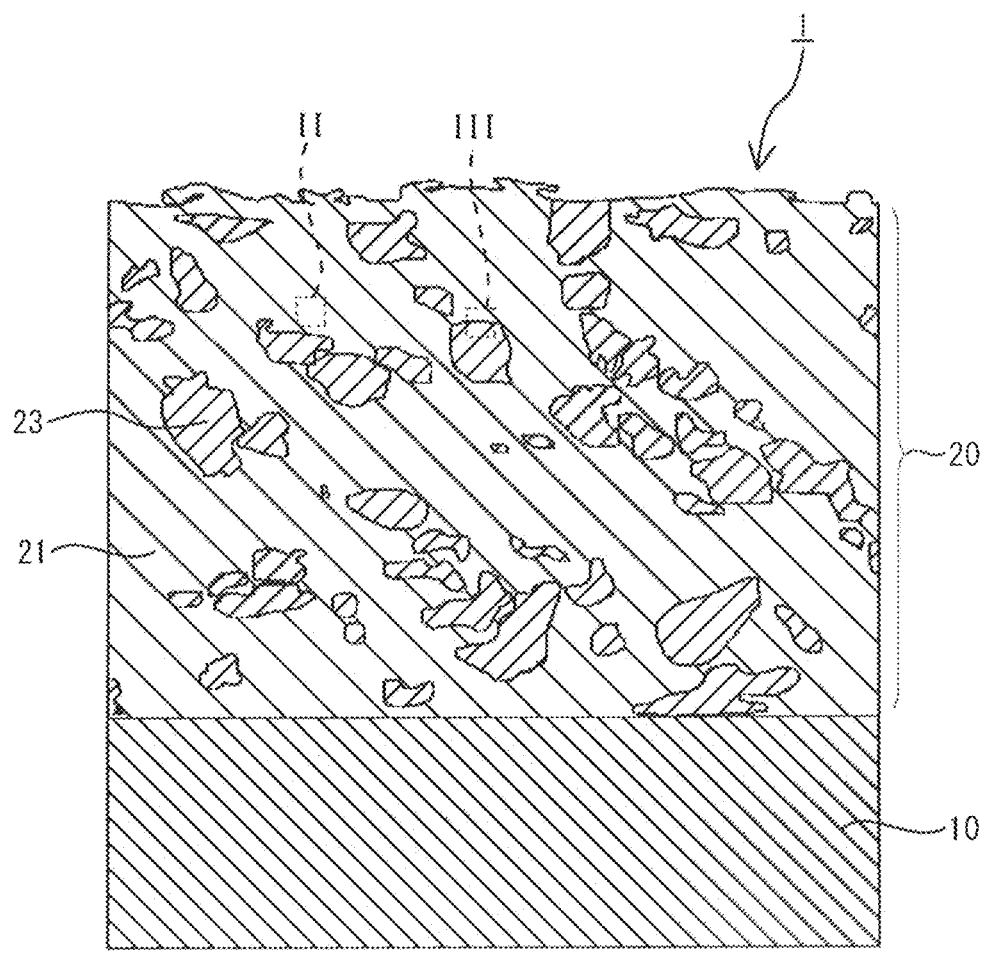
FIG. 1 is a schematic cross-sectional view of a laminate according to a first embodiment of the present invention.

FIG. 1 is a schematic cross-sectional view of a laminate according to a first embodiment of the present invention. As illustrated in FIG. 1, a laminate 1 of the present embodiment includes a base substrate 10 and a coating layer 20 formed on the base substrate 10. The coating layer 20 includes copper alloy portions 21 derived from precipitation-hardening copper alloy particles shown in FIGS. 2 and 3 described later in detail and hard particle portions 23 which are harder than the copper alloy portions 21, the hard particle portions being derived from hard particles. Further, each of the hard particle portions 23 has a non-spherical shape. Furthermore, in the coating layer 20, these portions, for example, the copper alloy portions 21, 21, the copper alloy portions 21 and the hard particle portions 23 and the hard particle portions 23, 23 are bounded to each other via an interface.

In the present invention, the "precipitation-hardening copper alloy" means not only a copper alloy that has already been precipitation-hardened but also a copper alloy prior to the precipitation-hardening. Of the copper alloy portions, it is preferable that all the copper alloy portions are the copper alloys already subjected to the precipitation-hardening, however it is not limited to this. For example, of the copper alloy portions, one portion of the copper alloy portions may be the copper alloy already subjected to precipitation-hardening, and the remainder of the copper alloy portions may be the copper alloy prior to the precipitation-hardening. Moreover, for example, all of the copper alloy portions may be the copper alloy prior to the precipitation-hardening. The precipitation-hardening copper alloy is also referred to as a particle dispersion-strengthened copper alloy.

In the present invention, "each of the hard particle portions has a non-spherical shape" means that an aspect ratio of each of the hard particle portions is 1.3 or more in its median value. Although not particularly limited, more specifically, the aspect ratio of each of the hard particle portions is preferably 1.3 or more and 2.0 or less in median value. The "aspect ratio" is defined as (maximum long diameter/ width orthogonal to maximum long diameter) in each of the hard particle portions, when any cross section is observed along a layer thickness direction of the coating layer with a scanning electron microscope (SEM). Further, the "maximum long diameter" means a maximum distance among distances between any two points on an outline of each of the hard particle portions, when observing any cross section along the layer thickness direction of the coating layer with the scanning electron microscope (SEM). When calculating the median value of the aspect ratio, for example approximately three to thirty, at least approximately three to five hard particle portions observed during several to several ten views need to be measured.

As described above, the laminate of the present embodiment includes a base substrate, and a coating layer formed on the base substrate, wherein the coating layer includes the copper alloy portions derived from the precipitation-hardening copper alloy particles and the hard particle portions which are harder than the copper alloy portions, each of the hard particle portions being derived from the hard particles and having a non-spherical shape, and these portions (for example, the copper alloy portions, the copper alloy portion and the hard particle portion, the hard particle portions) are bounded to each other via an interface therebetween. Thus, the laminate has excellent abrasion resistance. The laminate also has a secondary advantage that it can secure high strength such as having a high tensile strength. Further, the laminate also has a secondary advantage that it can secure high thermal conductivity.

It is currently assumed that the above-described advantageous effects are obtained based on at least one of the following reasons.

For example, although described in detail later, it is assumed that these effects are generated, because the adhesiveness of the base substrate with the coating layer improves by an anchor effect in which the hard particles bite into the base substrate and/or the copper alloy portions, when a mixture containing the precipitation-hardening copper alloy particles and the hard particles which are harder than the copper alloy particles and which have a non-spherical shape, each being at least one raw material used in the method for manufacturing the laminate, is sprayed on the base substrate, and the hard particles collide with the base substrate and/or the copper alloy portions adhered on the base substrate. In other words, at least one plastically deformed portion formed on the base substrate, which comprises at least one flattened recess, improves adhesion between the base substrate and the coating layer. This will be described in detail later.

Moreover, for example, since each of the hard particle portions has a non-spherical shape, the copper alloy portions bite into the hard particle portions. It is assumed that this anchor effect improves the adhesion between the copper alloy portions and the hard particle portions in the coating layer.

Further, for example, when the base substrate has an oxide coating on the surface that inhibits adhesion between the base substrate and the coating layer, it is assumed that spraying the mixture containing the copper alloy particles and the hard particles which are harder than the copper alloy particles and which have a non-spherical shape onto the base substrate and resultant collision of the hard particles with the base substrate removes the oxide coating, to expose and form a new interface of the base substrate that has good adhesion with the coating layer.

Moreover, for example, when the copper alloy particles collide with the base substrate and/or the copper alloy portions adhered on the base substrate, it is assumed that the kinetic energy thereof is partly converted to thermal energy, which promotes deposition and atomic diffusion between the base substrate and the copper alloy particles and between the copper alloy particles and the copper alloy portions.

Further, for example, when the copper alloy particles collide with the base substrate, the copper alloy particles bite into the base substrate. It is assumed that this anchor effect improves the adhesion between the base substrate and the coating layer. In other words, at least one plastically deformed portion formed on the base substrate, which comprises at least one flattened recess, improves adhesion between the base substrate and the coating layer. This will be described in detail later.

Moreover, it is assumed that the adhesion between the copper alloy portions in the coating layer improves by the copper alloy particles and/or the copper alloy portions being deformed into a flat shape when the copper alloy particles collide with the base substrate and/or the copper alloy portions adhered on the base substrate. In other words, the flat copper alloy portions are deposited to form at least one plastically deformed portion in the coating layer, which reduces a gap between the copper alloy portions to improve the adhesion between the copper alloy portions in the coating layer.

Still furthermore, for example, when the copper alloy particles collide with the base substrate and/or the copper alloy portions adhered to the base substrate, heat is generated by at least one plastic deformation in the process of formation of at least one flattened recess in the base substrate and/or in the process of transformation of the copper alloy particles and the copper alloy portions into a flat shape, in other words in the process of the formation of at least one plastically deformed portion in the base substrate and/or the coating layer. It is assumed that this heat promotes deposition and atomic diffusion between the base substrate and the copper alloy particles and between the copper alloy particles and the copper alloy portions.

Figure 2:
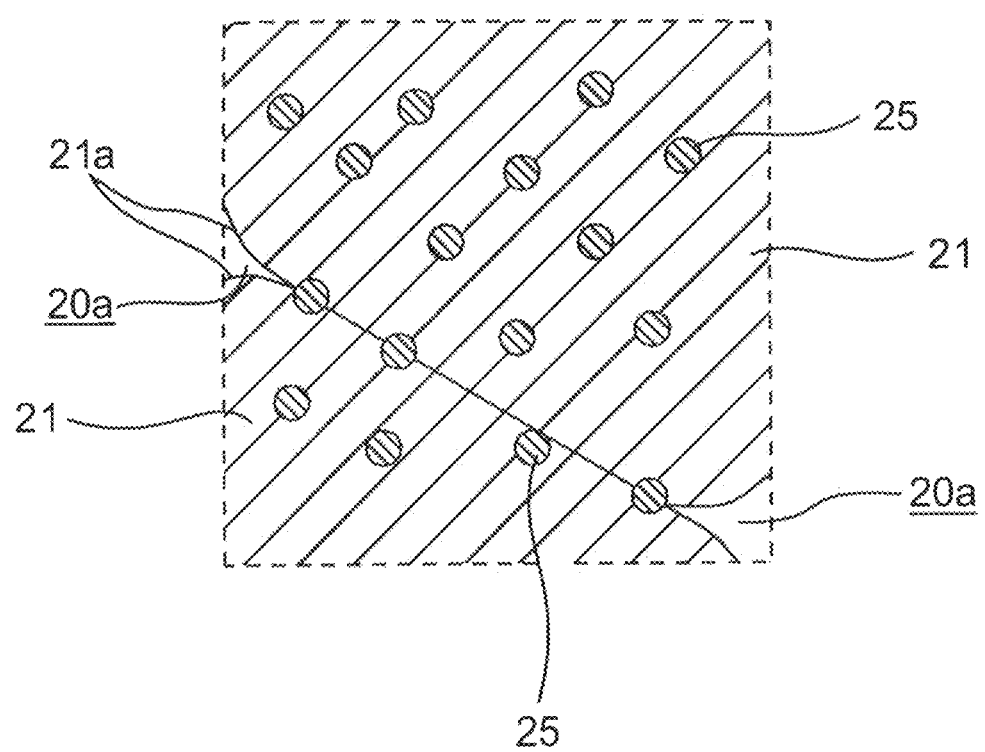
FIG. 2 is an enlargement of the part enclosed by line II of the laminate in FIG. 1.

Moreover, for example, FIG. 2 is an enlargement of the part enclosed by line II of the laminate in FIG. 1. As shown in FIG. 2, it is assumed that these effects are generated by precipitation hardening, because at least one precipitation phase 25 is present at least in a part of the copper alloy portions 21 and at an interface 21a between the copper alloy portions 21, 21. The coating layer 20 may have pores 20a.

Figure 3:
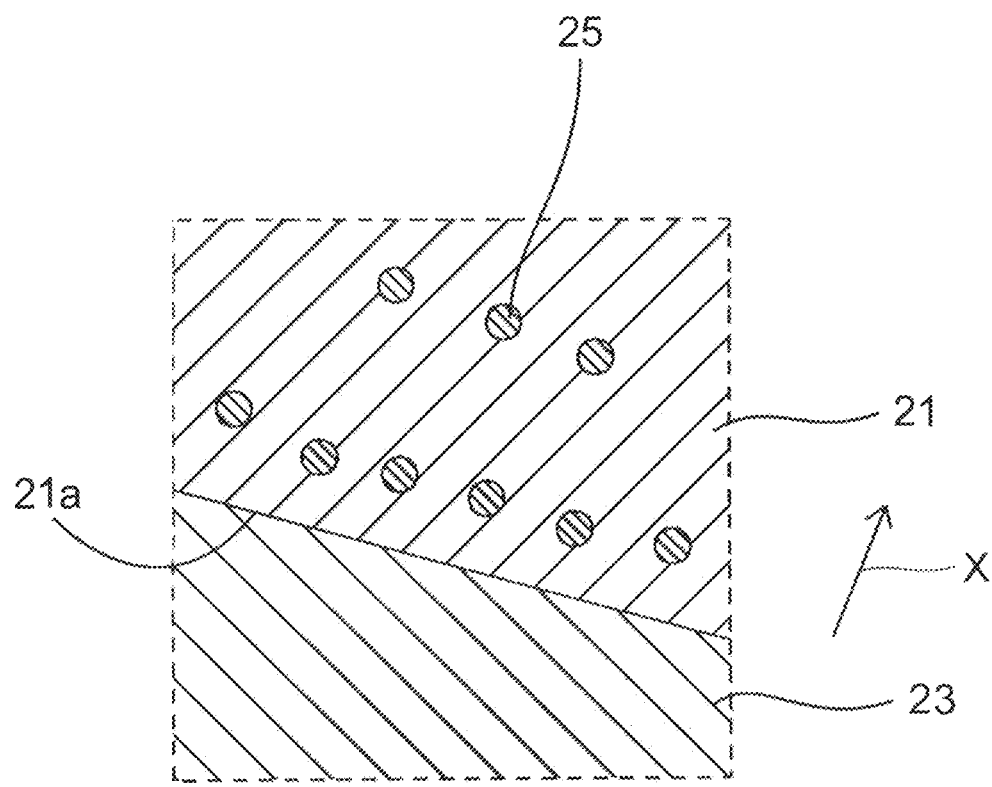
FIG. 3 is an enlargement of the part enclosed by line III of the laminate in FIG. 1.

Further, for example, FIG. 3 is an enlargement of the part enclosed by line III of the laminate in FIG. 1. As shown in FIG. 3, the hard particle portions 23 are harder than the copper alloy portions 21. This facilitates the precipitation of at least one precipitation phase 25 in the vicinity of the interface 21a of the copper alloy portions 21 adjacent to the hard particle portions 23 (In this specification, "in the vicinity of the interface of the copper alloy portion" indicates, for example a region of up to about 1 μm inwards of the copper alloy portions 21 from the interface 21a, as shown by the arrow X in the drawing), and at least one precipitation phase 25 may easily be contained. It is assumed that this precipitation hardening is one of the reasons. The aforementioned at least one precipitation phase 25 is typically made of nickel silicide ($Ni_2Si$).

It is assumed that the copper alloy portions 21, 21, and the copper alloy portion 21 and the hard particle portion 23 bond relatively easier than the hard particle portions 23, 23.

However, even when the above-described advantageous effects are obtained based on reasons other than the above reasons, it is needless to say that the present invention encompasses such a laminate and the like.

In the present invention, "the portions are bounded to each other via an interface between the parts" means that at least one of deposition, atomic diffusion, biting (intrusion) and formation of a plastically deformed portion has occurred between the portions.

The following describes each of the components in further detail.

The base substrate 10 is not particularly limited, however is preferably a metal that can be used for the method for manufacturing a laminate, that is, the method for forming the coating layer, which will be described in detail later. It is needless to say that when the laminate is used as a sliding member, it is preferred that the base substrate is usable under a high-temperature environment where the sliding member is applied.

Examples of metals that are preferably used include alloys of aluminum, iron, titanium, copper or the like known in the art.

Examples of aluminum alloys that are preferably used include AC2A, AC8A and ADC12 specified in the Japanese Industrial Standards. Examples of iron alloys that are preferably used include SUS304 specified in the Japanese Industrial Standards, and iron-based sintered alloys. Examples of copper alloys that are preferably used include beryllium copper and copper alloy-based sintered alloys.

The porosity of the coating layer 20 is not particularly limited. However, for example, a high porosity of the coating layer will cause insufficient strength, which may lead to decreased abrasion resistance. In this respect, it is preferred that the porosity of the coating layer is as low as possible. Further, to allow achievement of a laminate with any one of or both of a high strength such as high tensile strength and a high thermal conductivity, it is preferred that the porosity of the coating layer in a cross section is 3 area % or less, more preferably 1 area % or less, particularly 0 area %. Since it is currently possible to reduce the porosity to until 0.1 area %, it is preferred that the porosity ranges from 0.1 area % to 3 area % in terms of obtaining excellent abrasion resistance and high tensile strength, further an improvement in the productivity and the like in a good balance. However, it is needless to say that the percentage is not limited to these ranges at all and may be out of these ranges as long as the advantageous effects of the present invention are obtained. Moreover, the porosity in a cross section of the coating layer can be calculated by observation of a scanning electron microscopic (SEM) image or the like of a cross section of the coating layer and image processing of the scanning electron microscopic (SEM) cross-sectional image such as binarization.

The thickness of the coating layer 20 is not particularly limited. Namely, the thickness of the coating layer may be suitably adjusted according to the temperature and sliding environment of the portion on which the coating layer is applied. For example, the thickness ranges preferably from 0.05 mm to 5.0 mm, more preferably from 0.1 mm to 2.0 mm. If the thickness is less than 0.05 mm, the coating layer itself will lack rigidity. Especially when the strength of the base substrate is low, the coating layer may plastically deform. If the thickness of the coating layer is greater than 10 mm, the coating may peel off due to the relationship of the residual stress generated in film formation with the interfacial adhesion strength.

The precipitation-hardening copper alloy contained in the copper alloy portions 21 is not particularly limited. However, examples of the precipitation-hardening copper alloys that are preferably used include precipitation-hardening alloys containing nickel and silicon, in other words, so-called Corson alloys. As a result, excellent abrasion resistance is imparted.

However, the precipitation-hardening copper alloy is not limited thereto. Other examples that can also be used include chromium-containing precipitation-hardening copper alloys, in other words so-called chromium copper, and zirconium-containing precipitation-hardening copper alloys, in other words so-called zirconium copper. Yet further examples that can be used include precipitation-hardening copper alloys that contain one of chromium, zirconium and vanadium or any combination thereof in addition to nickel and silicon. It is possible to use a variety of materials according to the required specification of the laminate.

For example, with regard to the precipitation hardening copper alloys containing to nickel and silicon, the nickel content ranges preferably from 1 mass % to 21 mass % while the silicon content ranges preferably from 0.2 mass % to 8 mass %, since more excelling thermal conductivity can be achieved. For example, with regard to the precipitation hardening copper alloys containing chromium, the chromium content ranges preferably from 0.02 mass % to 1 mass %, since more excelling thermal conductivity can be achieved. For example, with regard to the precipitation hardening copper alloys containing nickel and silicon, the ratio of content of nickel and silicon (Ni:Si) ranges preferably from 3.5 to 4.5:1 in mass ratio in terms of allowing precipitation of nickel silicide ($Ni_2Si$). However, it is needless to say that the percentages and ratio is not limited to these ranges at all and may be out of these ranges as long as the advantageous effects of the present invention are obtained. It is needless to say that other elements may be further added to the precipitation-hardening copper alloys.

The hard particle portions 23 are not particularly limited, as long as they are hard particle portions which are harder than the copper alloy portions and which have a non-spherical shape. For example, it is possible to use alloy particle portions or ceramic particle portions, or alternatively hard particle portions mixing these at any proportion. Moreover, although not particularly limited, the hard particle portions are preferably harder than the base substrate. Furthermore, for example, in terms of obtaining a laminate with a further excellent abrasion resistance, it is preferable to employ, as alloy particle portions, iron-based alloy particles, cobalt-based alloy particles, chromium-based alloy particles, nickel-based alloy particles or molybdenum-based alloy particles, or hard particles mixing these at any proportion.

For the hardness of the copper alloy portions and hard particle portions, further copper alloy particles and hard particles later described in detail, for example, Vickers hardness measured and calculated according to the Vickers hardness test defined in the Japanese Industrial Standards (JIS Z 2244) may be utilized as their indicator. Moreover, an arithmetic mean value is used as the Vickers hardness, which arithmetic mean value is obtained by measuring approximately three to thirty particles, at least three to five particles for particles, and approximately three to thirty positions, at least three to five positions for the copper alloy portions and hard particle portions in the coating layer. Furthermore, when measuring and calculating the Vickers hardness of the copper alloy portions and the hard particle portions, observations of scanning electron microscope (SEM) images and transmission electron microscope (TEM) images of the coating layer, and energy dispersive X-ray (EDX) analysis and the like may be combined as necessary.

Examples of the aforementioned iron-based alloys include SUS 440C according to the Japanese Industrial Standards. Examples of such cobalt-based alloys include TRIBALOY (registered trademark) T-400 and T-800. Examples of such chromium-based alloys include ferrochromium. Examples of such nickel-based alloys include TRIBALOY (registered trademark) T-700. Examples of such molybdenum-based alloys include ferromolybdenum. Examples of such ceramics include WC/Co and $Al_2O_3$. Among these, cobalt-based alloys are preferably used since they have excellent abrasion resistance. Specifically, TRIBALOY (registered trademark) T-400, T-800 and the like are preferably used.

The proportion of the hard particle portions in a cross section of the coating layer is not particularly limited, but ranges preferably from 1 area % to 50 area %, more preferably from 1 area % to 25 area %, still more preferably from 1 area % to 18 area %, particularly preferably from 5 area % to 18 area % in terms of obtaining a laminate with more excellent abrasion resistance, tensile strength, and if necessary, thermal conductivity, although not particularly limited. However, it is needless to say that the proportion is not limited to these ranges at all and may be out of these ranges as long as the advantageous effects of the present invention are obtained. For example, the proportion of the hard particle portions in a cross section of the coating layer can be calculated by observation of a scanning electron microscopic (SEM) image or the like of a cross section of the coating layer and image processing of the scanning electron microscopic (SEM) cross-sectional image such as binarization. Further, it is needless to say that the area % calculated by observation of a cross section can be regarded as volume %, and volume % can be converted to weight % using the density of the respective particles.

As described above, the proportion of the hard particle portions in a cross section of the coating layer ranges preferably from 1 area % to 50 area % in terms of obtaining a laminate with more excellent abrasion resistance and thermal conductivity. However, for an application that does not essentially require high thermal conductivity but requires excellent abrasion resistance, the proportion of the hard particle portions in the cross section of the coating layer may range from 50 area % to 99 area %. Further, the coating layer may include third portions in addition to the copper alloy portions and the hard particle portions.

Second Embodiment

Next, a laminate according to a second embodiment of the present invention will be described in detail with reference to the drawings. Components identical to those described in the aforementioned embodiment will be assigned with the same reference signs, and descriptions thereof will be omitted.

Figure 4:
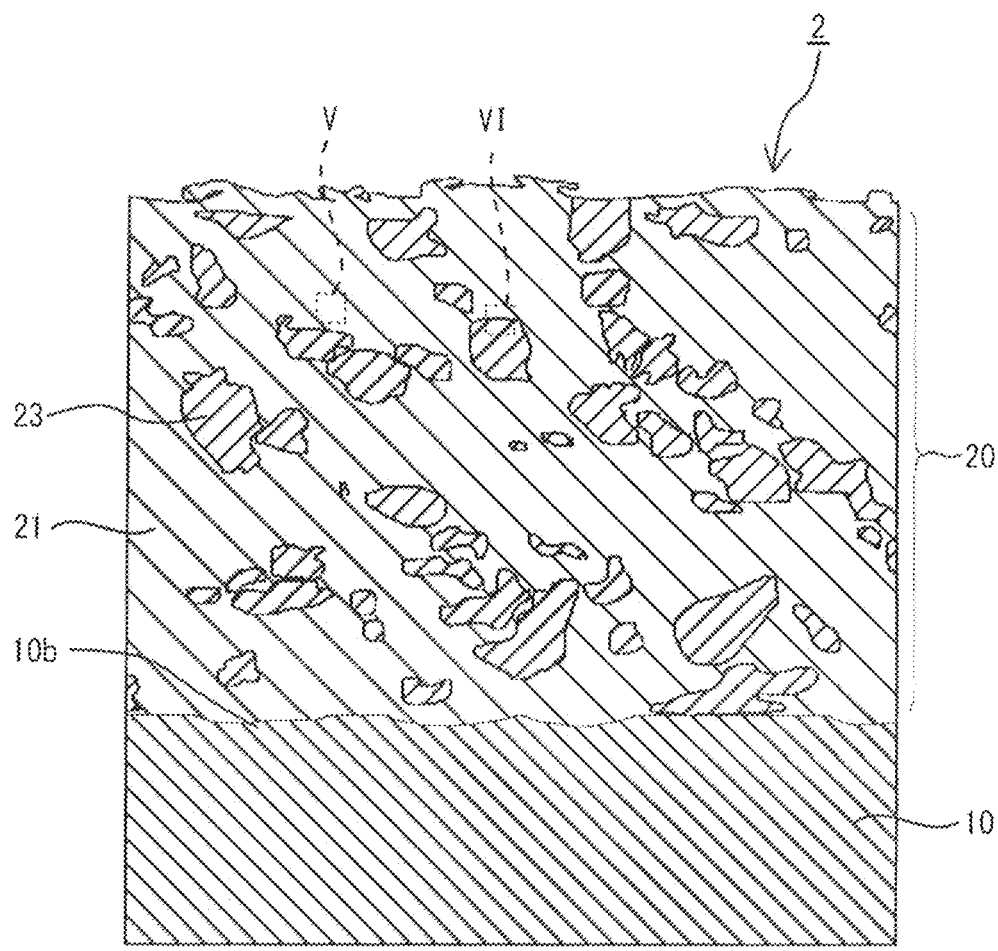
FIG. 4 is a schematic cross-sectional view of a laminate according to a second embodiment of the present invention.
Figure 5:
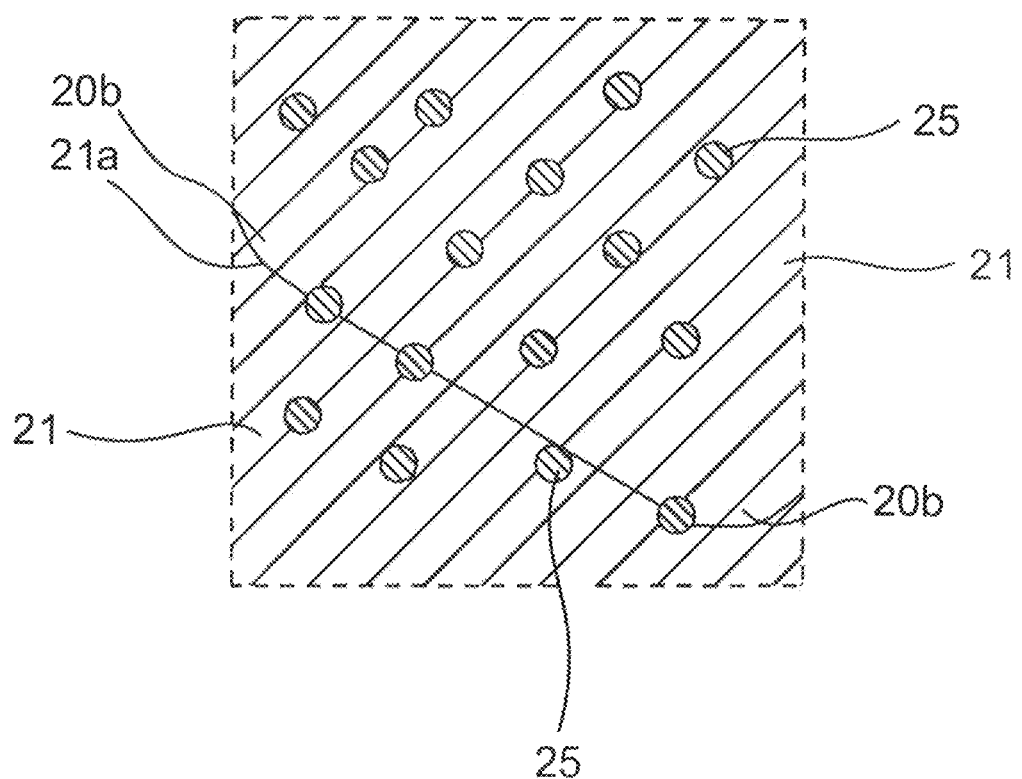
FIG. 5 is an enlargement of the part enclosed by line V of the laminate in FIG. 4.
Figure 6:
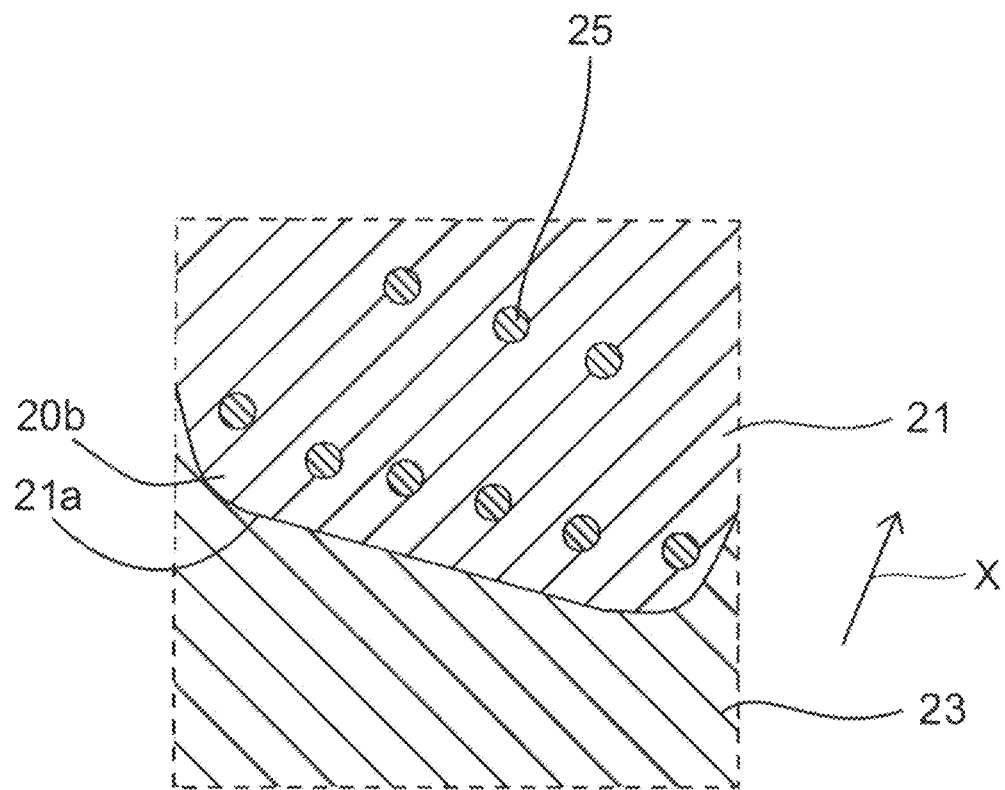
FIG. 6 is an enlargement of the part enclosed by line VI of the laminate in FIG. 4.

FIG. 4 is a schematic cross-sectional view of a laminate according to the second embodiment of the present invention. FIG. 5 is an enlargement of the part enclosed by line V of the laminate in FIG. 4. Further, FIG. 6 is an enlargement of the part enclosed by line VI of the laminate in FIG. 4. As shown in FIG. 4 to FIG. 6, a laminate 2 of the present embodiment is different from the laminate of the aforementioned first embodiment in the point that the base substrate 10 has at least one plastically deformed portion 10*b* made of at least one flat recess, and that the coating layer 20 has at least one plastically deformed portion 20*b* having a structure in which flat-shaped copper alloy portions 21 are accumulated. Although not illustrated, it is needless to say that the scope of the present invention includes a case in which one of the base substrate and the coating layer has at least one plastically deformed portion.

As described above, the laminate of the present embodiment includes a base substrate, and a coating layer formed on the base substrate, wherein the coating layer includes copper alloy portions derived from precipitation-hardening copper alloy particles, and hard particle portions which are harder than the copper alloy portions, each of the hard particle portions is derived from the hard particles and has a non-spherical shape, these portions (for example, the copper alloy portions, the copper alloy portion and the hard particle portion, the hard particle portions) are bounded to each other via an interface therebetween, and further, at least one of the base substrate and the coating layer has at least one plastically deformed portion. Thus, the laminate has further excelling abrasion resistance. Further, the laminate also has a secondary advantage that it can secure high strength such as having a higher tensile strength. Further, the laminate also has a secondary advantage that it can secure higher thermal conductivity.

It is currently assumed that the above-described advantageous effects are obtained based on at least one of the following reasons.

For example, when the copper alloy particles, which are at least one raw material used in the method for manufacturing the laminate, collide with the base substrate, the copper alloy particles bite into the base substrate. It is assumed that this anchor effect improves the adhesion between the base substrate and the coating layer. Namely, as described above, it is assumed that adhesion between the base substrate and the coating layer is improved, because at least one plastically deformed portion, which comprises at least one flattened recess, is formed on the base substrate.

Moreover, it is assumed that these effects are obtained, because the adhesion between the copper alloy portions in the coating layer due to the copper alloy particles and the copper alloy portions being deformed into a flat shape, when the copper alloy particles collide with the base substrate and/or the copper alloy portions adhered on the base substrate. Namely, as described above, it is also assumed that these effects are obtained, because the adhesion between the copper alloy portions in the coating layer improves due to a gap (pore) between the copper alloy portions becoming small by the formation of at least one plastically deformed portion having a structure in which flat-shaped copper alloy portions are accumulated. For example, in FIG. 2, the coating layer 20 may have pores 20a. On the other hand, in FIG. 5, the pores in the coating layer 20 decrease and it becomes hard to observe them.

Further, for example, when the hard particles collide with the base substrate, the copper alloy particles bite into the base substrate. It is assumed that this anchor effect improves the adhesion between the base substrate and the coating layer. Namely, as described above, it is assumed that these effects are obtained, because the adhesion between the base substrate and the coating layer is improved due to the formation of at least one plastically deformed portion including at least one flat recess on the base substrate.

However, it is needless to say that the present invention encompasses those laminates even when the above-described advantageous effects are obtained based on reasons other than the above.

Third Embodiment

Next, a laminate according to a third embodiment of the present invention will be described in detail with reference to the drawings. Components identical to those described in the aforementioned embodiments will be assigned with the same reference signs, and descriptions thereof will be omitted.

Figure 7:
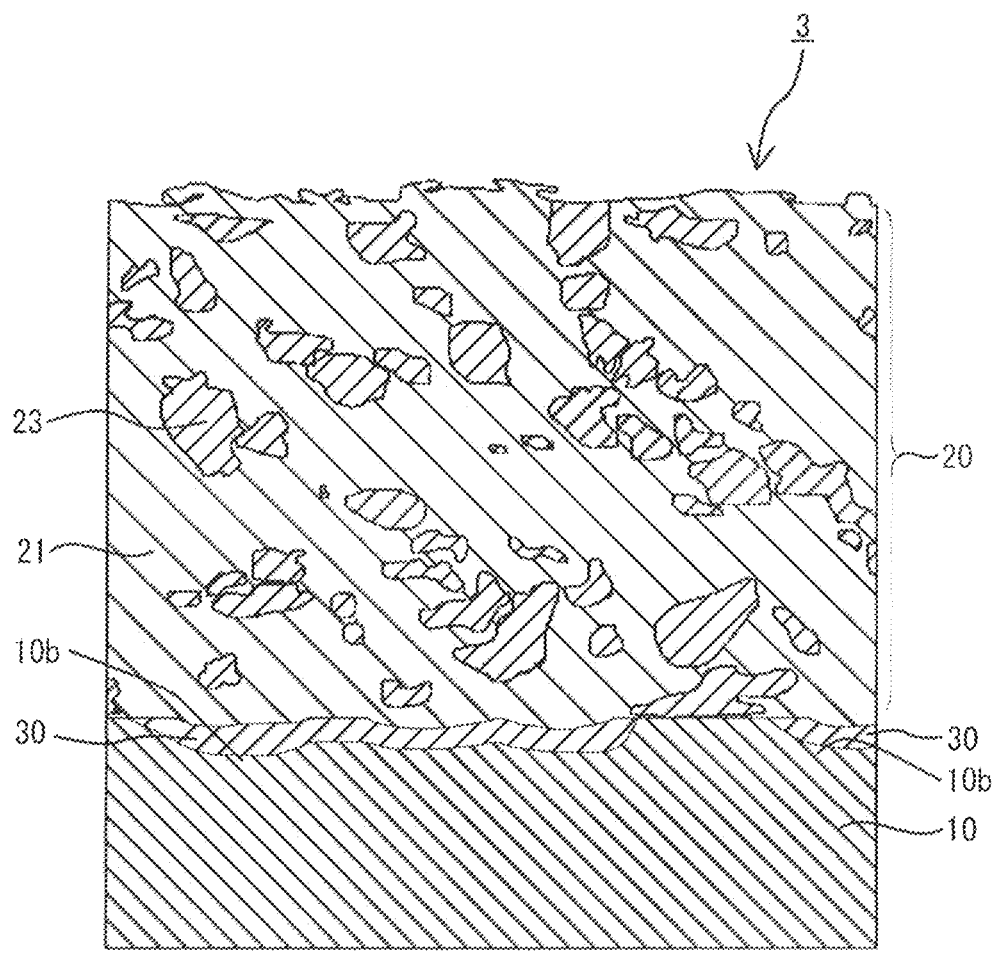
FIG. 7 is a schematic cross-sectional view of a laminate according to a third embodiment of the present invention.

FIG. 7 is a schematic cross-sectional view of a laminate according to the third embodiment of the present invention. As illustrated in FIG. 7, a laminate 3 of the present embodiment is different from the laminate of the first or second embodiment in the point that the laminate 3 includes a predetermined intermediate layer 30 formed on the entire interface between the base substrate 10 and the coating layer 20. The predetermined intermediate layer 30 includes at least one diffusion layer or at least one intermetallic compound layer, or alternatively at least one diffusion layer and at least one intermetallic compound layer. In the case in which the intermediate layer includes at least one diffusion layer, the intermediate layer may consist of the diffusion layer. In the case in which the intermediate layer includes at least one intermetallic compound layer, the intermediate layer may consist of the intermetallic compound layer.

As described above, the laminate of the present embodiment includes a base substrate, and a coating layer formed on the base substrate, wherein the coating layer includes copper alloy portions derived from precipitation-hardening copper alloy particles, and hard particle portions which are harder than the copper alloy portions, each of the hard particle portions is derived from hard particles and has a non-spherical shape, these portions (for example, the copper alloy portions, the copper alloy portion and the hard particle portion, the hard particle portions) are bounded to each other via an interface therebetween, and further, at least one intermediate layer is provided, which contains at least one of at least one diffusion layer and at least one intermetallic compound layer and which is formed on at least one portion of an interface between the base substrate and the coating layer. Thus, the laminate has further excelling abrasion resistance. Further, the laminate also has a secondary advantage that it can secure high strength such as having a higher tensile strength. Further, the laminate also has a secondary advantage that it can secure higher thermal conductivity. It is needless to say that at least one of the base substrate and the coating layer may have at least one plastically deformed portion.

It is currently assumed that the aforementioned advantageous effects are obtained based on the following reasons.

It is assumed that the effect is obtained, for example, due to the followings: when a mixture containing the copper alloy particles being the raw material used in the manufacturing method of the laminate and the hard particles being harder than the copper alloy portions and having a non-spherical shape is sprayed onto the base substrate, and the copper alloy particles collide with the base substrate for example, that kinetic energy is partially converted into thermal energy; this causes diffusion of constituent element contained in the base substrate and at least one of the copper alloy particles and the copper alloy portions therebetween, to form at least one intermediate layer containing at least one of at least one diffusion layer and at least one intermetallic compound layer between the base substrate and the coating layer. This will be described in detail later. In a case in which, for example, the base substrate has on its surface an oxide coating that inhibits the adhesion of the base substrate and the coating layer, when the hard particles collide with the base substrate, that oxide coating is removed to expose and form a new interface of the base substrate, thus facilitating the diffusion of the constituent element.

However, even when the above-described advantageous effects are obtained based on reasons other than the above reasons, it is needless to say that the present invention encompasses such laminates.

The intermediate layer 30 will be described in more detail. The intermediate layer includes at least one diffusion layer or at least one intermetallic compound layer or includes at least one diffusion layer and at least one intermetallic compound layer. In a preferred example, the diffusion layer has a gradient structure of the composition. However, the diffusion layer is not limited to such layers with a gradient structure of the composition. In a preferred example, the intermediate layer with at least one intermetallic compound layer includes diffusion layers with a gradient structure of the composition between which at least one intermetallic compound layer is disposed. However, the intermediate layer is not limited thereto. For example, the intermediate layer contains the constituent elements of the base substrate and the constituent elements of the copper alloy portions. More specifically, when the base substrate is made of an aluminum alloy, the intermediate layer to be formed is made of an alloy that contains aluminum and copper. However, the intermediate layer is not limited thereto. For example, when the base substrate is made of stainless steel (SUS), the intermediate layer to be formed is made of an alloy that contains the constituent elements of stainless steel (SUS), and copper.

Fourth Embodiment

Next, a sliding member according to a fourth embodiment of the present invention, namely, a sliding member having the aforementioned laminate in at least one sliding portion, will be described with reference to the drawings. As the sliding member, a sliding member of an internal combustion engine is raised as an example to describe the embodiment in detail, however it is not particularly limited to this. It is also needless to say that a front surface side of the laminate serves as a sliding surface. Components identical to those described in the aforementioned embodiments will be assigned with the same reference signs, and descriptions thereof will be omitted.

Figure 8:
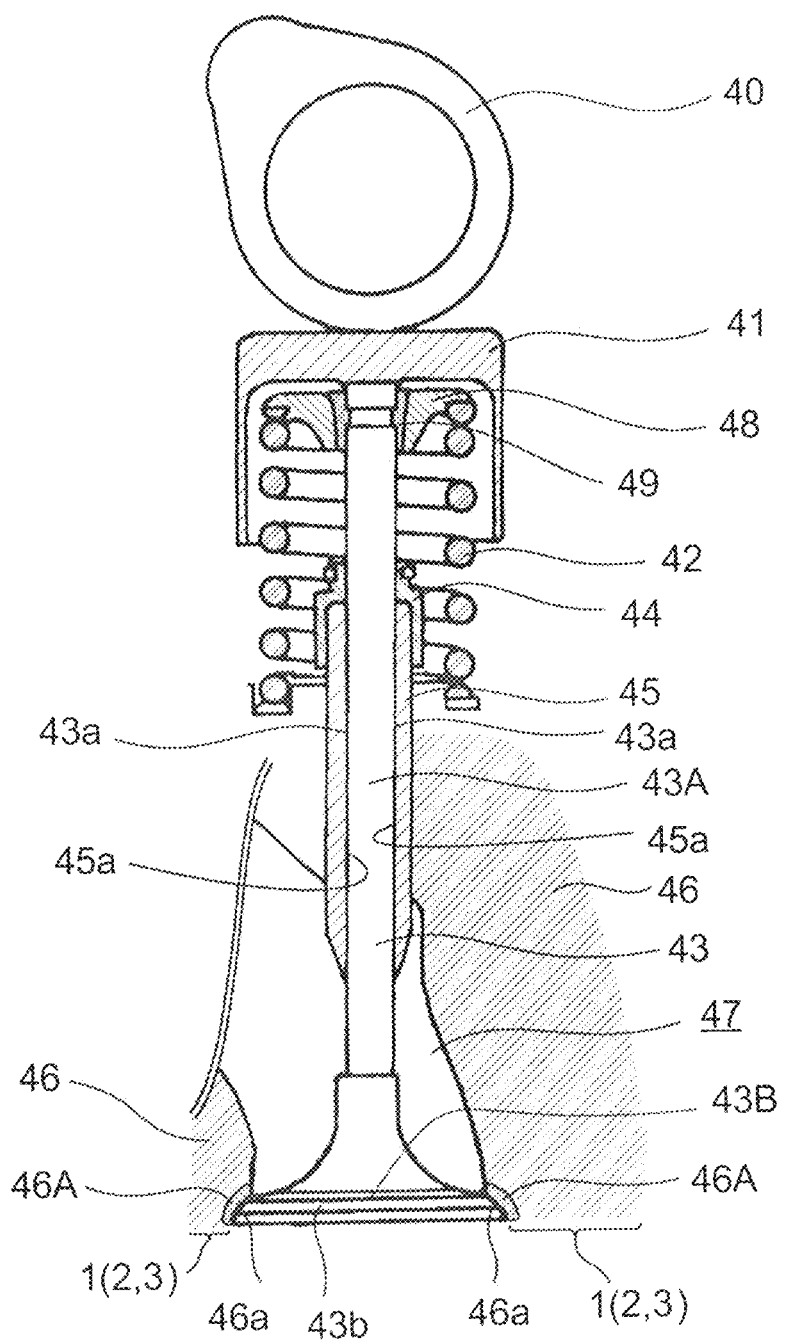
FIG. 8 is a schematic cross-sectional view of a sliding member of an internal combustion engine that includes the sliding member in at least one sliding portion.

FIG. 8 is a schematic cross-sectional view of a sliding member of an internal combustion engine that includes the laminate in at least one sliding portion of the internal combustion engine. To be more specific, FIG. 8 is a schematic cross-sectional view of a valve actuating mechanism including an engine valve. As illustrated in FIG. 8, when a cam lobe 40 rotates, a valve lifter 41 is pushed down while a valve spring 42 is compressed. Simultaneously, an engine valve 43 is pushed down by being guided by a valve guide 45 having a stem seal 44. As a result, the engine valve 43 separates from a seat part 46A for the engine valve 43 in a cylinder head 46 so that an exhaust port 47 communicates with a combustion chamber (not illustrated) (an engine valve open state). Thereafter, a further rotation of the cam lobe 40 causes the valve lifter 41, a retainer 48 and a cotter 49 to be pushed up along with the engine valve 43 due to a repulsion force of the valve spring 42. As a result, the engine valve 43 contacts the seat part 46A so that the exhaust port 47 is shut off from the combustion chamber (not illustrated) (an engine valve closed state). The engine valve 43 opens and closes in synchronization with the rotation of the cam lobe 40 in such way. As such, the valve stem 43A of the engine valve 43, while being lubricated with oil, is inserted through the valve guide 45 that is press-fitted on the cylinder head 46 side. A valve face 43B of the engine valve 43, which serves as an on-off valve of the combustion chamber (not illustrated), is in or out of contact with the seat part 46A of the engine valve 43 in the cylinder head 46 during operation. While FIG. 8 illustrates the exhaust port 47 side, the sliding member of the present invention may also be applied on an intake port side (not illustrated).

The aforementioned laminate with the coating layer formed, for example, the aforementioned laminates (1, 2, 3) according to the first to third embodiments, is applied to the cylinder head and a sliding surface 46a of the seat part 46A of the engine valve in the cylinder head, which sliding surface 46a is a sliding portion of the engine valve. As a result, an excellent abrasion resistance is imparted. Further, the sliding member also has a secondary advantage that it can secure high strength such as having a high tensile strength. Further, the sliding member also has a secondary advantage that it can secure high thermal conductivity. Moreover, by applying the laminate of the present invention to the cylinder head, it is possible to eliminate the press-fit valve sheet. This improves the flexibility in the shape of an exhaust port and an intake port and enables increasing the diameter of an engine valve. Therefore, it is possible to improve fuel consumption, power output, torque of an engine and the like.

Although not shown in the drawings, the aforementioned laminate with the coating layer formed, for example, the laminates according to the first to third embodiments mentioned above, is also applicable to, for example, one or both of the sliding surfaces of the valve stem and a counterpart valve guide, and/or at least one position selected from the group consisting of the sliding surface of a valve stem end, the sliding surface of the valve face and the sliding surface of the press-fitted valve seat. As a result, a sliding member with excellent abrasion resistance is obtained. Further, the sliding member also has a secondary advantage that it can secure high strength such as having a high tensile strength. Further, the sliding member also has a secondary advantage that it can secure high thermal conductivity.

That is, the cylinder head of the present embodiment preferably includes the laminate of the aforementioned embodiments in the seat part for the engine valve. Another cylinder head of the present embodiment is a cylinder head having a valve seat including the laminate of the aforementioned embodiments, and preferably has the laminate in the seat part for the engine valve of the valve seat. Further, the valve seat of the present embodiment preferably includes the laminate of the aforementioned embodiments in the seat part for the engine valve. The engine valve of the present embodiment preferably also includes the laminate of the aforementioned embodiments in the valve face. Furthermore, another engine valve of the present embodiment preferably includes the laminate of the aforementioned embodiments in at least one sliding portion against the valve guide.

Further, the laminate also has a secondary advantage that it can secure high strength such as having a higher tensile strength. Therefore, the use of the laminate of the present invention is not limited to the sliding member used in the sliding portion. For example, the laminate of the present invention can be a high-strength member used in a non-sliding portion, and may implement an aluminum sprocket.

Fifth Embodiment

Next, a sliding member according to a fifth embodiment of the present invention, namely, a sliding member including the aforementioned laminate in at least one sliding portion, will be described in detail with reference to the drawings. It is needless to say that a front side of the laminate is used as a sliding surface. Components identical to those described in the aforementioned embodiments will be assigned with the same reference signs, and descriptions thereof will be omitted.

Figure 9:
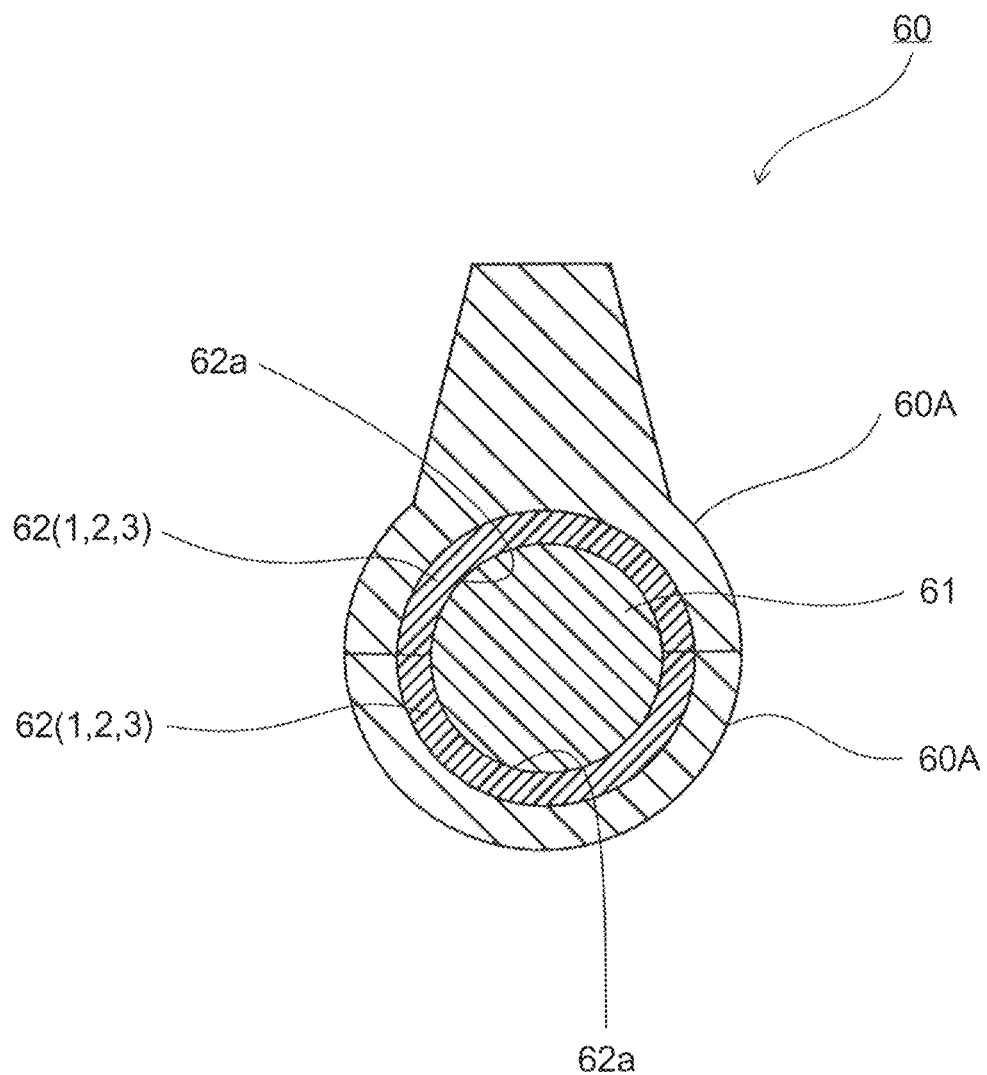
FIG. 9 is a schematic cross-sectional view of a bearing mechanism of an internal combustion engine that includes a laminate in a bearing metal of the bearing mechanism of the internal combustion engine.

FIG. 9 is a schematic cross-sectional view of a bearing mechanism of an internal combustion engine that includes a laminate in a bearing metal of the bearing mechanism of the internal combustion engine. More specifically, FIG. 9 is a schematic cross-sectional view of a bearing metal that serves as a sliding member of a connecting rod. As illustrated in FIG. 9, a big end 60A of the connecting rod 60, which is located on a crank (not shown) side, is divided into two, upper and lower parts. On the big ends 60A are disposed two divided bearing metals 62 for supporting a crank pin 61.

The aforementioned laminate with the coating layer formed, for example, the laminates (1, 2, 3) according to the aforementioned first to third embodiments, is applied to sliding surfaces 62a as the bearing metals 62. As a result, the sliding member with excellent abrasion resistance is obtained. Further, the sliding member also has a secondary advantage that it can secure high strength such as having a high tensile strength. Further, the sliding member also has a secondary advantage that it can secure high thermal conductivity.

Although not shown in the drawings, the aforementioned laminate with the coating layer formed, for example, the laminates according to the aforementioned first to third embodiments, is also applicable to the sliding surface of the two divided bearing metals for supporting a piston pin of the connecting rod, which is located at a small end on a piston side (not shown). As a result, the sliding member with excellent abrasion resistance is obtained. Further, the sliding member also has a secondary advantage that it can secure high strength such as having a high tensile strength. Further, the sliding member also has a secondary advantage that it can secure high thermal conductivity.

That is, the bearing mechanism of the internal combustion engine of the present embodiment preferably includes the laminate of the aforementioned embodiments in the bearing metal of the bearing mechanism of the internal combustion engine. It is also possible to directly deposit (directly form without using metal) on the sliding surface on the big end side of the connecting rod. Moreover, it is also possible to directly deposit (directly form without using metal) on the sliding surface on the small end side of the connecting rod.

The sliding member of the internal combustion engine of the present embodiment may also be applied to a piston ring and a piston. That is, the coating layer is preferably applied to the surface of a piston ring. Further, the coating layer is preferably applied to an inner surface of a ring groove of the piston. Furthermore, in the sliding member of the internal combustion engine of the present embodiment, the coating layer is preferably applied on an inner surface of a cylinder bore (this may serve as an alternative to a cylinder liner, or an alternative for bore thermal spraying). Moreover, in the sliding member of the internal combustion engine of the present embodiment, the coating layer is preferably applied on a metal of a journal of a crank shaft. Furthermore, in the sliding member of the internal combustion engine of the present embodiment, the coating layer is preferably directly deposited onto the metal part of the journal of the crank shaft (the coating layer is directly formed without using metal). Moreover, in the sliding member of the internal combustion engine of the present embodiment, the coating layer is preferably applied on a surface of a metal of a journal of a camshaft. Furthermore, the sliding member of the internal combustion engine of the present embodiment, the coating layer is preferably directly deposited onto the metal part of the journal of the camshaft (the coating layer is directly formed without using metal). Moreover, in the sliding member of the internal combustion engine of the present embodiment, the coating layer is preferably applied on a cam lobe surface of the camshaft. Furthermore, in the sliding member of the internal combustion engine of the present embodiment, the coating layer is preferably applied on a metal of the piston and the piston pin. Moreover, in the sliding member of the internal combustion engine of the present embodiment, the coating layer is preferably directly deposited on a metal part of the piston and the piston pin. Furthermore, in the sliding member of the internal combustion engine of the present embodiment, the coating layer is preferably applied on a surface of a piston skirt. Moreover, in the sliding member of the internal combustion engine of the present embodiment, the coating layer is preferably applied on a crown surface of a valve lifter. Furthermore, in the sliding member of the internal combustion engine of the present embodiment, the coating layer is preferably applied on a side surface of the valve lifter. Moreover, in the sliding member of the internal combustion engine of the present embodiment, the coating layer is preferably applied on a sliding surface against the valve lifter of a lifter bore in the cylinder head. Furthermore, in the sliding member of the internal combustion engine of the present embodiment, the coating layer is preferably applied on a surface of teeth of a sprocket (at this time, for example, the coating layer is formed on a sprocket made of aluminum sintered alloy instead of a sprocket made of iron sintered alloy). Moreover, in the sliding member of the internal combustion engine of the present embodiment, the coating layer is preferably applied to pins of a chain. Furthermore, in the sliding member of the internal combustion engine of the present embodiment, the coating layer is preferably applied to chain plates.

Moreover, in the sliding member in the aforementioned first to third embodiments, the coating layer is preferably applied on a surface of teeth of a gear other than the internal combustion engine (at this time, for example, a steel gear is made into aluminum alloy, and the coating layer is formed on this aluminum alloy). As used herein, examples of objects that are not an internal combustion engine include an automobile differential gear, an automobile power generator, and a non-automobile power generator. Furthermore, the sliding member in the aforementioned first to third embodiments is preferably applied to general sliding bearings (sliding bearing in the broader means, which are not rolling-element bearings).

Sixth Embodiment

Next, a method for manufacturing a laminate according to a sixth embodiment of the present invention will be described in detail. This method for manufacturing a laminate includes: a step of spraying a mixture in a non-molten state including precipitation-hardening copper alloy particles and hard particles that have a non-spherical shape and are harder than the copper alloy particles onto a base substrate to form a coating layer on the base substrate. This method for manufacturing a laminate is one form of the method for manufacturing the laminates according to the above-described first to third embodiments.

As described above, by forming the coating layer on the base substrate by spraying a mixture containing precipitation-hardening copper alloy particles made not to precipitate additive elements in a non-melted state, and hard particles maintaining the non-spherical shape and maintaining to be harder than the copper alloy particles in the non-melted state, it is possible to efficiently form the coating layer excellent in abrasion resistance. Further, this method for manufacturing a laminate also has a secondary advantage that it can efficiently form a coating layer that can secure high strength such as having a high tensile strength. Further, this method for manufacturing a laminate also has a secondary advantage that the coating layer that can secure high thermal conductivity can be formed efficiently. In other words, by forming the coating layer by a method called kinetic spraying, cold spraying, warm spraying or the like, it is possible to efficiently form a coating layer having excellent abrasion resistance, tensile strength, thermal conduction property and the like. However, the laminate of the present invention is not limited to those manufactured by this method.

A more specific manufacturing method will be described in more detail.

As described above, when the mixture is sprayed onto the base substrate, it is preferred that the mixture be sprayed onto the base substrate at a speed that forms at least one plastically deformed portion in at least one of the base substrate and the coating layer upon spraying the copper alloy particles on the base substrate. This thus efficiently forms a coating layer further excelling in abrasion resistance. Further, this method for manufacturing a laminate also has a secondary advantage that it can efficiently form a coating layer that can secure high strength such as having a higher tensile strength. Further, this method for manufacturing a laminate also has a secondary advantage that the coating layer that can secure a higher thermal conductivity can be formed efficiently.

However, the speed for spraying the copper alloy particles is not limited to the aforementioned speed. For example, the particle speed ranges preferably from 300 m/s to 1200 m/s, more preferably from 500 m/s to 1000 m/s, yet more preferably from 600 m/s to 800 m/s. The pressure of operating gas supplied for spraying the particles preferably ranges from 2 MPa to 5 MPa, more preferably from 3.5 MPa to 5 MPa. When the pressure of the operating gas is less than 2 MPa, a sufficient particle speed cannot be achieved, which may result in a large porosity. However, it is needless to say that the pressure is not limited to these ranges at all and may be out of these ranges as long as the advantageous effects of the present invention are obtained.

The temperature of the operating gas is not particularly limited, however, for example, ranges preferably from 400° C. to 800° C., more preferably from 600° C. to 800° C. If the temperature of the operating gas is less than 400° C., the abrasion resistance may decrease due to the large porosity. If the temperature of the operating gas exceeds 800° C., the nozzle may sometimes be clogged. However, it is needless to say that the temperature is not limited to these ranges at all and may be out of these ranges as long as the advantageous effects of the present invention are obtained.

The type of the operating gas is not particularly limited. However, examples of operating gas include nitrogen and helium. They may be used alone or in combination of two or more. Further, a mixture of fuel gas and nitrogen may also be used.

After the coating layer is formed, the laminated member may be aged or tempered at 250° C. to 500° C. for a period of 0.5 hour to 4 hours. This can improve the abrasion resistance, tensile strength, thermal conductivity and the like. This aging or tempering may be also done, for example, by utilizing heat from a combustion chamber in a test run in an inspection that is conducted after the engine is assembled.

The copper alloy particles of the raw material are not particularly limited as long as they are in a non-molten state and are composed of any precipitation hardening copper alloy particles. It is needless to say that it is preferably a copper alloy prior to precipitation hardening. For example, the copper alloy particles are preferably in a supersaturated solid solution state. Since the copper alloy particles exhibit high ductility, in other words high deformability in the supersaturated solid solution state, the coating layer can be formed efficiently, and film formability can be improved. The particles in the supersaturated solid solution state are not particularly limited. For example, it is preferable to use rapidly-solidified particles obtained by rapid solidification such as atomization. When the copper alloy particles collide with the base substrate or the like, such collision causes pressure application, and frictional heat generated by a difference in deformation speed with the base substrate and the like due to the flattening of the particles. A fine hard phase (precipitation phase) is thus formed by that pressure and that frictional heat. As a result, the coating layer increases in strength.

The hard particles of the raw material are not particularly limited and may be any hard particles in a non-molten state that is harder than the copper alloy particles and have a non-spherical shape. For example, it is preferable to apply alloy particles or ceramics particles, or a mixture containing these at any proportion. As the alloy particles, it is preferable to apply iron-based alloy particles, cobalt-based alloy particles, chromium-based alloy particles, nickel-based alloy particles or molybdenum-based alloy particles, or alternatively a mixture containing these at any proportion.

The hard particles of the raw material are not particularly limited. However, particles produced by water atomization are preferably used. When particles are produced by water atomization, water strikes electric droplets to deform them. The deformed droplets are cooled by the water at that time and solidified in a non-spherical deformed shape. In contrast, in a technique of spraying gas, particles return to a spherical shape due to insufficient cooling.

Although the grain size of the copper alloy particles and the hard particles used as the raw materials is not particularly limited, the grain size is preferably 150 μm or less, and more preferably 75 μm or less. The grain size of the particles may be adjusted with a sieve or by a conventionally known suitable method in the art. Here, as the "grain size", we may use d95 based on number, measured and calculated with an image analytical particle size distribution measuring instrument. A "particle size" for measuring and calculating such a grain size may be, for example, a maximum distance between any two points on an outline of observed particles (in an observation plane). However, the "particle size" is not limited thereto and may employ, for example, a diameter of an equivalent circle of the observed particles (in the observation plane). Furthermore, d95 based on number, measured and calculated with a laser diffraction scattering particle size distribution measuring instrument may also be used. By forming the laminate using such copper alloy particles and hard particles, it is possible to efficiently form a coating layer excelling in abrasion resistance. Further, this method for manufacturing a laminate has a secondary advantage that it can efficiently form a coating layer that can secure high strength such as having a higher tensile strength. Further, this method for manufacturing a laminate also has a secondary advantage that the coating layer that can secure a higher thermal conductivity can be formed efficiently.

Although the average particle size of the copper alloy particles and the hard particles used as the raw material is not particularly limited, the average particle size ranges, for example, preferably from 5 μm to 40 μm, more preferably from 20 μm to 40 μm. If the average particle size is less than 5 μm, the low fluidity may cause insufficient supply of the particles. If the average particle size exceeds 50 μm, the insufficient particle speed in film forming may result in poor film forming. As the "average particle size", for example, an average particle size (d50) based on number may be used, which d50 is measured and calculated with the image analytical particle size distribution measuring instrument. Further, "particle size" for measuring and calculating such average particle size may represent, for example, the maximum distance between any two points on the outline of an observed particle (in an observation plane). However, the "particle size" is not limited thereto and may represent, for example, a diameter of an equivalent circle of the observed particle (in the observation plane). Alternatively, the "average particle size" may represent number average particle size (d50) that is measured and calculated with laser diffraction scattering particle size distribution measuring instrument. However, it is needless to say that the raw material is not limited to these ranges at all and may be out of these ranges as long as the advantageous effects of the present invention are obtained.

Moreover, although not particularly limited, the average particle size of the copper alloy particles is preferably smaller than the average particle size of the hard particles. By forming the laminate using such copper alloy particles and hard particles, it is possible to efficiently form a coating layer more excelling in abrasion resistance. Further, this method for manufacturing a laminate has a secondary advantage that it can efficiently form a coating layer that can secure high strength such as having a higher tensile strength. Further, this method for manufacturing a laminate also has a secondary advantage that the coating layer that can secure a higher thermal conductivity can be formed efficiently.

An aspect ratio in a median value of the copper alloy particles and hard particles used as the raw material is not particularly limited, as long as the hard particle portions have a non-spherical shape in the coating layer. For example, an image analytical particle size distribution measuring instrument can be used to measure and calculate the aspect ratio. It is also certainly possible that the aspect ratio can be measured and calculated by enlarging a scanning electron microscopic (SEM) image of the particles and measuring and calculating their size with a scale.

EXAMPLES

Hereinafter, the present invention will be described in more detail with examples. However, the present invention is not limited to the following examples.

Example 1

First, copper-nickel-silicon alloy particles (composition: Cu-3Ni-0.7Si, water-atomized particles, grain size (d95): 60.7 μm, average particle size (d50): 27.7 μm, aspect ratio (median value): 1.59, Vickers hardness: 64 Hv (0.01)) was prepared as the copper alloy particles serving as a raw material.

Further, cobalt-based alloy particles (composition: Co—Mo—Cr, water-atomized particles, grain size (d95): 64.6 μm, average particle size (d50): 37.5 μm, aspect ratio (median value): 1.68, Vickers hardness: 783 Hv (0.025)) was prepared as the hard particles serving as a raw material.

The grain size (d95) is based on number, and was measured and calculated with an image analytical particle size distribution measuring instrument. The "particle size" represented the maximum distance between any two points on the outline of observed particles (in an observation plane). The average particle size (d50), which is number average particle size, was measured and calculated with an image analytical particle size distribution measuring instrument. The "particle size" represented the maximum distance between any two points on the outline of observed particles (in the observation plane). Furthermore, as for the aspect ratio, the scanning electron microscopic (SEM) image was enlarged to measure and calculate with a scale. Furthermore, the Vickers hardness was measured and calculated according to the Vickers hardness test defined in the Japanese Industrial Standards (JIS Z 2244). The measurements were made for ten pieces to obtain an arithmetic average.

A preprocessed aluminum base substrate was prepared by preprocessing an aluminum base substrate (Japanese Industrial Standards H 4040 A5056), assuming a target thickness of a coating layer as 0.2 mm in a finished condition of a seat part for an engine valve of a cylinder head.

Then, the aluminum base substrate was mounted on a rotary table, and the prepared mixture of the copper alloy particles and the hard particles (copper alloy particles:hard particles=50:50 (mass ratio)) was sprayed onto the prepared aluminum base substrate with a high-pressure cold sprayer (PCS-1000, Plasma Giken Corp., operating gas: nitrogen at a temperature of 600° C., a particle speed of 700 m/s to 750 m/s and a pressure of 4 MPa) while rotating the rotary table, to form a coating layer with a thickness of from 0.4 mm to 0.5 mm on the base substrate.

Thereafter, the coating layer was finished by machining into a shape of the seat part for the engine valve of the actual cylinder head. The laminate of the example was thus obtained. The thickness of the coating layer was 0.2 mm (the same applies to the following examples).

Examples 2 to 4

As shown in Table 1, laminates of each Example were obtained by repeating the same operations as Example 1, except that the specifications and mixed ratios of the copper alloy particles and the hard particles were altered.

Comparative Examples 1 to 5

As shown in Table 2, laminates of each Example were obtained by repeating the same operations as Example 1, except that the specifications and mixed ratios of the copper alloy particles and the hard particles were altered. TRIBALOY (registered trademark) T400 and T-700 are products of Kennametal Stellite Corp.

TABLE 1

| | | Example 1 | Example 2 | Example 3 | Example 4 |
|---|---|---|---|---|---|
| Copper alloy particles | Material type | Cu—3Ni—0.7Si | Cu—3Ni—0.7Si | Cu—3Ni—0.7Si | Cu—14Ni—3Si—1V |
| | Particle manufacturing method | Water atomizing | Water atomizing | Water atomizing | Water atomizing |
| | Grain size (d95) (μm) | 60.7 | 64.3 | 64.3 | 63.9 |
| | Average particle size (d50) (μm) | 27.7 | 31.6 | 31.6 | 33.2 |
| | Aspect ratio (median value) | 1.59 | 1.64 | 1.64 | 1.84 |
| | Vickers hardness (HV 0.01) | 64.1 | 87.2 | 87.2 | 215 |
| Hard particles | Material type | Co—Mo—Cr | Co—Mo—Cr | Co—Mo—Cr | Co—Mo—Cr |
| | Particle manufacturing method | Water atomizing | Water atomizing | Water atomizing | Water atomizing |
| | Grain size (d95) (μm) | 64.6 | 32.2 | 32.2 | 32.2 |
| | Average particle size (d50) (μm) | 37.5 | 15.8 | 15.8 | 15.8 |
| | Aspect ratio (median value) | 1.68 | 1.40 | 1.40 | 1.40 |
| | Vickers hardness (HV 0.025) | 783 | 784 | 784 | 784 |
| Film formation conditions | Mixed proportion (mass ratio) Copper alloy particles: Hard particles | 50:50 | 60:40 | 70:30 | 50:50 |
| | Gas temperature (° C.) | 600 | 600 | 600 | 600 |
| | Gas pressure (MPa) | 4 | 4 | 4 | 4 |
| | Particle speed (m/s) | 700-750 | 700-750 | 700-750 | 700-750 |

TABLE 1-continued

Figure 11:
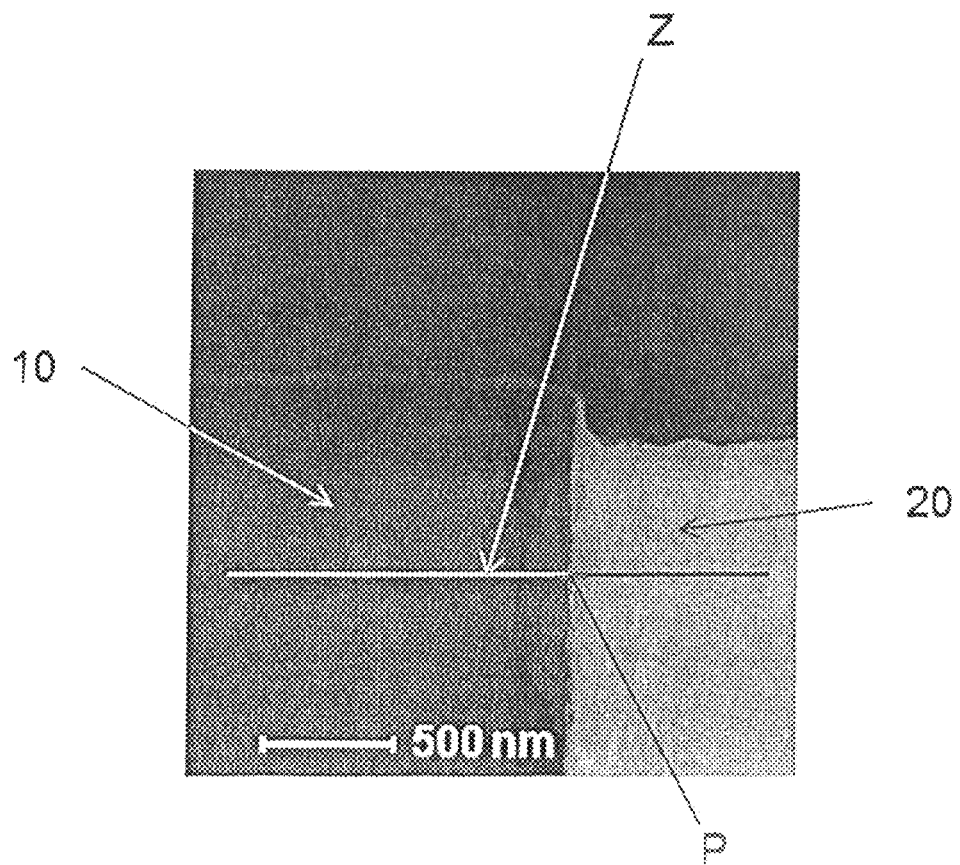
FIG. 11 is a transmission electron microscopic (TEM) cross-sectional image of the laminate of Example 1.
Figure 12:
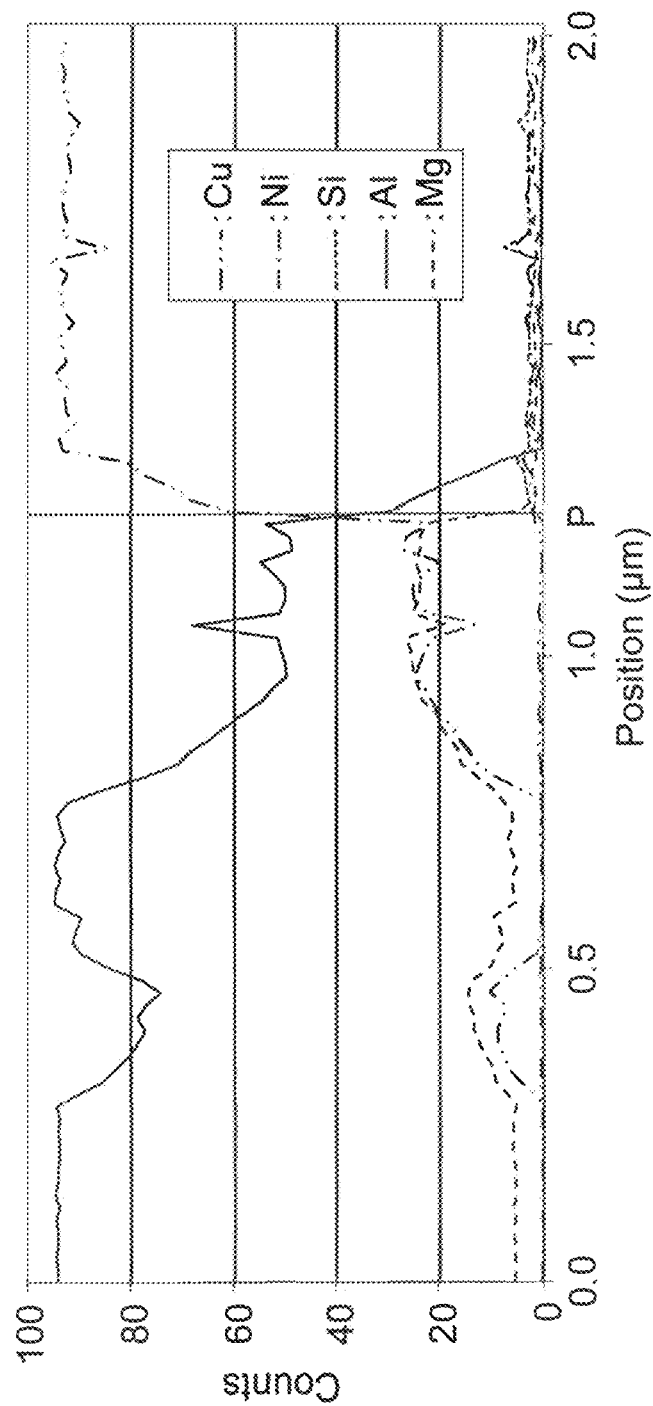
FIG. 12 is a graph illustrating the result of an energy dispersive X-ray (EDX) analysis of the laminate of Example 1.

|  |  | Example 1 | Example 2 | Example 3 | Example 4 |
|---|---|---|---|---|---|
| Coating layer | Vickers hardness of Copper alloy portions (HV 0.1) | 221 | 218 | 215 | 304 |
|  | Vickers hardness of Hard particle portions (HV 0.025) | 940 | 972 | 968 | 1039 |
|  | Proportion of Hard particle portions (area %) | 15.4 | 8.3 | 5.3 | 16.6 |
|  | Porosity (area %) | 1.0 | 0.7 | 0.2 | 1.0 area % or less |
|  | Aspect ratio of Hard particle portions (median value) | 1.65 | 1.76 | 1.64 | 1.81 |
|  | State of interface between base substrate and coating layer | FIGS. 11, 12 | — | — | — |
|  | Abrasion resistance (amount of abrasion (μm)) | 14.1 | 12.2 | 20.4 | 42.3 |
|  | Tensile strength (MPa) | 304 | 329 | 315 | — |

TABLE 2

|  |  | Comparative Example 1 | Comparative Example 2 | Comparative Example 3 | Comparative Example 4 | Comparative Example 5 |
|---|---|---|---|---|---|---|
| Copper alloy particles | Material type | Cu—3Ni—0.7Si | Cu—3Ni—0.7Si | Cu—3Ni—0.7Si | Cu—3Ni—0.7Si | Cu—14Ni—3Si—1V |
|  | Particle manufacturing method | Water atomizing | Water atomizing | Water atomizing | Water atomizing | Water atomizing |
|  | Grain size (d95) (μm) | 60.7 | 60.7 | 64.3 | 60.7 | 63.9 |
|  | Average particle size (d50) (μm) | 27.7 | 27.7 | 31.6 | 27.7 | 33.2 |
|  | Aspect ratio (median value) | 1.59 | 1.59 | 1.64 | 1.59 | 1.84 |
|  | Vickers hardness (HV 0.01) | 64.1 | 64.1 | 87.2 | 64.1 | 215 |
| Hard particles | Material type | Tribaloy T-400 | Tribaloy T-700 | — | — | — |
|  | Particle manufacturing method | Gas atomizing | Gas atomizing | — | — | — |
|  | Grain size (d95) (μm) | 52.0 | 52.2 | — | — | — |
|  | Average particle size (d50) (μm) | 35.4 | 33.4 | — | — | — |
|  | Aspect ratio (median value) | 1.07 | 1.09 | — | — | — |
|  | Vickers hardness (HV 0.025) | 975 | 800 | — | — | — |
| Film formation conditions | Mixed proportion (mass ratio) Copper alloy particles: Hard particles | 50:50 | 50:50 | 100:0 | 100:0 | 100:0 |
|  | Gas temperature (° C.) | 600 | 600 | 600 | 600 | 600 |
|  | Gas pressure (MPa) | 4 | 4 | 4 | 4 | 4 |
|  | Particle speed (m/s) | 700-750 | 700-750 | 700-750 | 700-750 | 700-750 |
| Coating layer | Vickers hardness of Copper alloy portions (HV 0.1) | 212 | 214 | 212 | 208 | 275 |
|  | Vickers hardness of Hard particle portions (HV 0.025) | 962 | 977 | — | — | — |
|  | Proportion of Hard particle portions (area %) | 3 | 5 | 0 | 0 | 0 |
|  | Porosity (area %) | 0.1 | 1.0 area % or less | 1.0 area % or less | 1.0 area % or less | 1.0 area % or less |
|  | Aspect ratio of Hard particle portions (median value) | 1.18 | 1.25 | — | — | — |
|  | State of interlace between base substrate and coating layer | — | — | — | — | — |
| Abrasion resistance (amount of abrasion (μm)) |  | 66.1 | 51.6 | 41.8 | 39.5 | 42.6 |
| Tensile strength (MPa) |  | 190 | — | — | 192 | — |

The Vickers hardness of the copper alloy portions and hard particle portions in the coating layer of each Example in Tables 1 and 2 were measured and calculated according to the Vickers hardness test defined in the Japanese Industrial Standards (JIS Z 2244). The measurements were made at ten points to obtain the arithmetic average. To determine the measuring points, observation of a scanning microscopic (SEM) image, a transmission electron microscopic (TEM) image and the like of the coating layer and the result of an energy dispersive X-ray (EDX) analysis were used. Furthermore, the proportion of the hard particle portions and the porosity in the cross section of the coating layer of each Example were calculated by performing the observation of the scanning electron microscopic (SEM) image of the cross section of the coating layer and image processing of the scanning electron microscopic (SEM) cross-sectional image such as binarization, multiple times. The precipitation phase of the copper alloy portions of each Example was specified by the observation of a transmission electron microscopic (TEM) image of the cross section of the coating layer and energy dispersive X-ray (EDX) analysis. The presence or absence of an intermediate layer and the presence or absence of a plastically deformed portion in a cross section of the laminate of each example were determined by observation of a scanning electron microscopic (SEM) image of a cross section of the coating layer and an energy dispersive X-ray (EDX) analysis. In all of Examples 1 to 4 and Comparative Examples 1 to 5, a precipitation phase was observed, and a plastically deformed portion was observed in the base substrate and the coating layer.

Evaluation of Performance

The following performances were evaluated for the aforementioned laminate of each Example.

Abrasion Resistance

Figure 10:
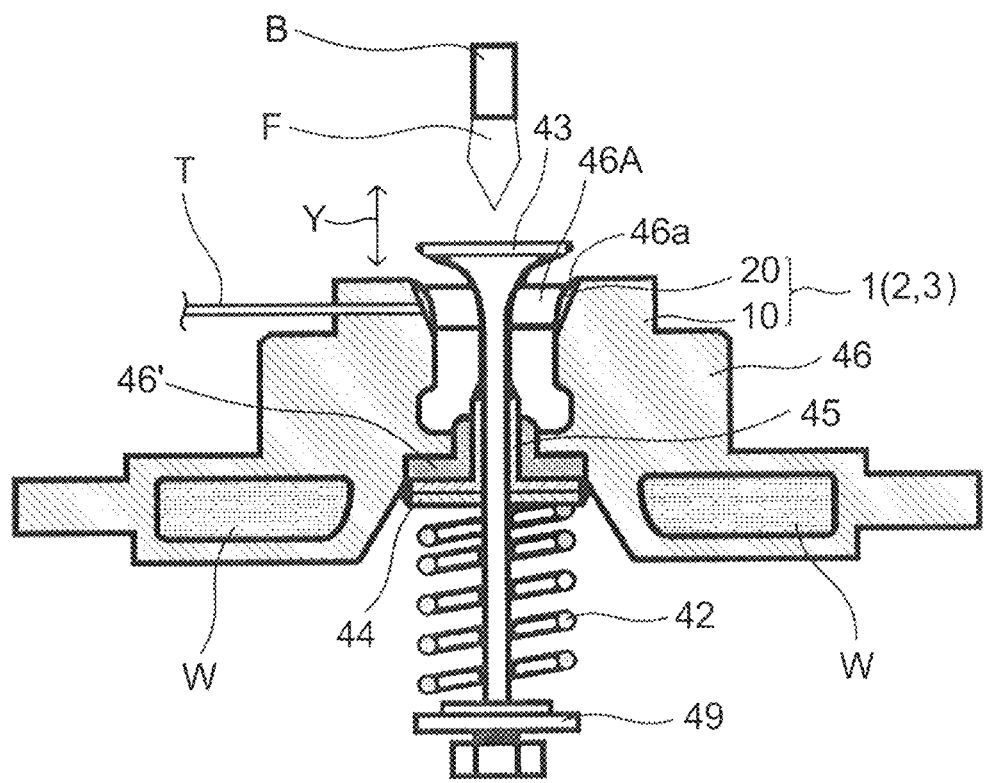
FIG. 10 is a schematic cross-sectional view of an abrasion tester.

FIG. 10 is a schematic cross-sectional view of an abrasion tester. As illustrated in FIG. 10, an abrasion tester resembling a valve actuating mechanism of an engine was fabricated from actual engine parts such as a valve spring 42, an engine valve 43, a stem seal 44, a valve guide 45, a cylinder head 46, 46' and a cotter 49. The laminate (1, 2, 3) obtained in each of the above examples was applied as a seat part 46A for the engine valve 43 of the cylinder head 46. The laminate (1, 2, 3) includes a predetermined coating layer 20 formed on the base substrate 10. The engine valve 43 shows an open state in the figure, and the engine valve 43 reciprocates in a vertical direction as illustrated by the arrow Y in the figure by means of an eccentric cam (not shown) so that the engine valve 43 repeatedly opens and closes. The sliding surface 46a of the seat part 46A for the engine valve 43 of the cylinder head 46 is in a high-temperature environment by means of a flame F of a gas burner B. The temperature of the seat part 46A is measured with a thermometer T. Cooling water W is circulated in the cylinder head 46.

The amount of abrasion was measured and calculated with the above-described abrasion tester in the following test conditions. Specifically, the shape of the seat part for the engine valve of the cylinder head was determined with a shape measuring instrument before and after the test. The amount of abrasion was measured at four points, and the average thereof was calculated, to obtain the amount of abrasion. The results are shown in Tables 1 and 2.

Test Conditions

Temperature: 300° C. (A seat part for an engine valve of a cylinder head on an exhaust port side was simulated.)

Number of inputs: 540000 times

Tensile Strength

The particles of each example were sprayed onto a flat-plate aluminum base substrate for a certain period of time in the same forming conditions as the coating layer of each example. A tensile test strip of JIS 14-B was prepared by the same machine processing, and the tensile strength thereof was measured. The tensile test strip and the tensile test method conformed to JIS-Z-2201 and Z-2241. Specifically, the tensile strength was calculated from a breaking load and a section area of a parallel part of the tensile test strip measured in advance. The results are shown in Tables 1 and 2.

As seen from Tables 1 and 2, Examples 1 to 4 within the scope of the present invention exhibited less amount of abrasion than Comparative Examples 1 to 5 that are out of the scope of the present invention, and had excellent abrasion resistance even at high temperatures. It also can be seen that Examples 1 to 3 can secure a higher tensile strength than Comparative Examples 1 and 4. The tensile strength of Examples 1 to 3 are nearly equal. Further, Examples 1 to 4 use copper alloy particles, thus having excellent thermal conductivity.

It is assumed that the laminates having excellent abrasion resistance as in Examples 1 to 4 were obtained, because a coating layer, which includes copper alloy portions derived from precipitation-hardening copper alloy particles and hard particle portions harder than the copper alloy portions, each of the hard particle portions being derived from hard particles and having a non-spherical shape, and in which these portions (for example, the copper alloy portions, the copper alloy portion and the hard particle portion, the hard particle portions) are bounded to each other via an interface therebetween, was formed on the base substrate. Furthermore it is assumed that the laminates having a high tensile strength as in Examples 1 to 3 were obtained, because coating layers, which include copper alloy portions derived from precipitation-hardening copper alloy particles and hard particle portions harder than the copper alloy portions, each of the hard particle portions being derived from hard particles and having a non-spherical shape, and in which these portions (for example, the copper alloy portions, the copper alloy portion and the hard particle portion, the hard particle portions) are bounded to each other via an interface therebetween, were formed on the base substrates.

Moreover, it may be assumed that the laminates having the excellent abrasion resistance as in Examples 1 to 4 were obtained, because the hard particle portions comprise cobalt-based alloy particles. Further, it may be assumed that the laminates having the high tensile strength as in Examples 1 to 3 were obtained, because the hard particle portions comprise cobalt-based alloy particles.

Further, it is assumed that the laminates having the excellent abrasion resistance as in Examples 1 to 4 were obtained, because the proportion of the hard particle portions in the section of the coating layer is 5 area % to 18 area %. It may also be assumed that the laminates having the high tensile strength as in Examples 1 to 3 were obtained, because the proportion of the hard particle portions in the section of the coating layer is 5 area % to 18 area %.

It may be also assumed that the laminates having the excellent abrasion resistance as in Examples 1 to 4 were obtained, because the precipitation-hardening copper alloy contains nickel and silicon as the additive elements. It may also be assumed that the laminates having the high tensile strength as in Examples 1 to 3 were obtained, because the precipitation-hardening copper alloy contains nickel and silicon as the additive elements.

Furthermore, it may be also assumed that the laminates having the excellent abrasion resistance as in Example 4 were obtained, because the precipitation-hardening copper alloy contains vanadium as a further additive element.

Moreover, it may also be assumed that the laminates having the excellent abrasion resistance as in Examples 1 to 4 were obtained, because at least one of the base substrate and coating layer includes at least one plastically deformed portion. Furthermore, it is also assumed that the laminates having the high tensile strength as in Examples 1 to 3 were obtained, because at least one of the base substrate and coating layer includes at least one plastically deformed portion.

Furthermore, it may also be assumed that the laminates having the excellent abrasion resistance as in Examples 1 to 4 were obtained, because the porosity in the cross section of the coating layer is 1 area % or less. Furthermore, it may be also assumed that the laminates having the high tensile strength as in Examples 1 to 3 were obtained, because the porosity in the cross section of the coating layer is 1 area % or less.

FIG. 11 is a transmission electron microscopic (TEM) cross-sectional image of the laminate of Example 1 around the interface between the base substrate 10 and the coating layer 20. FIG. 12 is a graph illustrating a result of an energy dispersive X-ray (EDX) analysis (linear analysis) of the laminate of Example 1 along line Z in FIG. 11. The point P in FIG. 11 indicates the same point as the point P in FIG. 12. In FIG. 12, the point of 0.0 μm corresponds to the end part of the line Z on the base substrate 20 side, and the point of 2.0 μm corresponds to the end part of the line Z on the coating layer 20 side in FIG. 11.

As can be seen in FIGS. 11 and 12, the laminate includes the base substrate 10 of an aluminum alloy, a coating layer 20 of a copper alloy formed on the base substrate 10 and an intermediate layer that is formed between the base substrate 10 and the coating layer 20. The intermediate layer can be seen as formed at a position of approximately 0.75 μm to 1.31 μm. Further, the diffusion layers can be seen as formed at the position of approximately 0.75 μm to 0.96 μm and the position of approximately 1.23 μm to 1.31 μm. The diffusion layers can be seen as having a gradient structure of the composition. Further, at the position from approximately 0.96 μm to 1.23 μm, the ratio of aluminum, magnesium and copper is approximately Al:Mg:Cu=2:1:1 (atomic ratio), which indicates that an intermetallic compound layer is formed.

It is also assumed that the laminate having such high abrasion resistance and high tensile strength as in Example 1 was obtained, because the intermediate layer was provided, the intermediate layer being formed at least partially between the base substrate and the coating layer and including both the diffusion layers and the intermetallic compound layer. Further, it is also assumed that the laminate having such high abrasion resistance and high tensile strength as in Example 1 was obtained, because the intermediate layer that includes the diffusion layers with a gradient structure of the composition was provided and/or because the intermetallic compound layer has the intermediate layer, the intermediate layer having the structure of being sandwiched between the diffusion layers with a gradient structure of the composition.

Further, it is also assumed that the laminate having such high abrasion resistance as in Examples 1 to 4 was obtained, because the method for manufacturing the laminate includes a step of spraying a mixture in a non-molten state including precipitation-hardening copper alloy particles and hard particles that have a non-spherical shape and are harder than the copper alloy particles onto a base substrate to form a coating layer on the base substrate. It is also assumed that the laminates having the high tensile strength as in Examples 1 to 3 were obtained, because the method for manufacturing the laminate includes a step of spraying a mixture in a non-molten state including precipitation-hardening copper alloy particles and hard particles that have a non-spherical shape and are harder than the copper alloy particles onto a base substrate to form a coating layer on the base substrate.

Moreover, it may also be assumed that the laminates having the excellent abrasion resistance as in Examples 1 to 4 were obtained, because the hard particle portions comprise cobalt-based alloy particles. Further, it may also be assumed that the laminates having the high tensile strength as in Examples 1 to 3 were obtained, because the hard particle portions comprise cobalt-based alloy particles.

Furthermore, it may also be assumed that the laminates having the excellent abrasion resistance as in Examples 1 to 4 were obtained, because the mixture is sprayed onto the base substrate at a speed that forms at least one plastically deformed portion in at least one of the base substrate and the coating layer upon spraying the copper alloy particles on the base substrate. Further, it may also be assumed that the laminates having the high tensile strength as in Examples 1 to 3 were obtained, because the mixture is sprayed onto the base substrate at a speed that forms at least one plastically deformed portion in at least one of the base substrate and the coating layer upon spraying the copper alloy particles on the base substrate.

Moreover, it may also be assumed that the laminates having the excellent abrasion resistance as in Examples 1 to 4 were obtained, because each of the copper alloy particles is in a supersaturated solid solution state, or is a rapidly-solidified particle. Further, it may also be assumed that the laminates having the high tensile strength as in Examples 1 to 3 were obtained, because each of the copper alloy particles in a supersaturated solid solution state, or is a rapidly-solidified particle.

Furthermore, it may also be assumed that the laminates having the excellent abrasion resistance as in Examples 1 to 4 were obtained, because each of the hard particles is a particle manufactured by water atomization. Furthermore, it may also be assumed that the laminates having the high tensile strength as in Examples 1 to 3 were obtained, because each of the hard particles is a particle manufactured by water atomization.

It may also be assumed that the laminates having the excellent abrasion resistance as in Examples 1 to 3 were obtained, because the copper alloy particles and hard particles have a grain size of 75 μm or less.

Further, it may also be assumed that the laminate having the excellent abrasion resistance as in Examples 1 was obtained, because the average particle size of the copper alloy particles are smaller than the average particle size of the hard particles. It may also be assumed that the laminate having the high tensile strength as in Example 1 was obtained, because the average particle size of the copper alloy particles are smaller than the average particle size of the hard particles.

While the present invention is described with some embodiments and examples, the present invention is not limited thereto, and a variety of changes can be made within the scope of the present invention.

For example, the components of the above-described embodiments and examples are not limited to the respective embodiments and examples. For example, changes can be made in the components such as the specification and the blend ratio of the copper alloy particles and the hard particles and the layer forming conditions. Further, the components of the embodiments and the examples can be combined in a different way from the above-described embodiments and examples.

REFERENCE SIGNS LIST 1, 2, 3: Laminate
10: Base substrate
10b: Plastically deformed portion
20: Coating layer
20a: Pore
20b: Plastically deformed portion
21: Copper alloy portion
21a: Interface
23: Hard particle portion
25: Precipitation phase
30: Intermediate layer
40: Cam lobe
41: Valve lifter
42: Valve spring
43: Engine Valve
43A: Valve stem
43a: Sliding surface
43B: Valve face
43b: Sliding surface
44: Stem seal
45: Valve guide
45a: Sliding surface
46, 46': Cylinder head
46A: Seat part
46a: Sliding surface
47: Exhaust port
48: Retainer
49: Cotter
60: Connecting rod
60A: Big end
61: Crank pin
62: Bearing metal
62a: Sliding surface
B: Gas burner
F: Flame
T: Thermometer
W: Cooling water

The invention claimed is:

1. A laminate comprising:
a base substrate; and
a coating layer formed on the base substrate;
wherein the coating layer includes copper alloy portions derived from precipitation-hardening copper alloy particles and hard particle portions which are harder than the copper alloy portions;
the hard particle portions are derived from hard particles;
the portions bond with each other via an interface;
each of the hard particle portions has a non-spherical shape;
an aspect ratio of the hard particle portions is 1.3 or more in a median value; and
an average particle size of the copper alloy particles and the hard particles are within a range of 15.8 μm to 40 μm.

2. The laminate according to claim 1, wherein the hard particle portions comprise at least one type of hard particle selected from the group consisting of: iron-based alloy particles, cobalt-based alloy particles, chromium-based alloy particles, nickel-based alloy particles, molybdenum-based alloy particles, or ceramic-based particles.

3. The laminate according to claim 1, wherein a proportion of the hard particle portions in a cross section of the coating layer is 1 area % to 50 area %.

4. The laminate according to claim 1, wherein the copper alloy portions contain nickel and silicon as additive elements.

5. The laminate according to claim 4, wherein each of the copper alloy portions further contains, as an additive element, at least one type of element selected from the group consisting of: chromium, zirconium, or vanadium.

6. The laminate according to claim 1, wherein at least one of the base substrate and the coating layer comprises at least one plastically deformed portion.

7. The laminate according to claim 1, wherein a porosity in a cross section of the coating layer is 3 area % or less.

8. The laminate according to claim 1, comprising at least one intermediate layer formed at least partially between the base substrate and the coating layer, and the aforementioned at least one intermediate layer includes at least one of at least one diffusion layer or at least one intermetallic compound layer.

9. The laminate according to claim 1, wherein a proportion of the hard particle portions in a cross section of the coating layer is 5.3 area % to 50 area %.

10. A sliding member comprising a laminate at a sliding portion, the laminate comprising;
a base substrate; and
a coating layer formed on the base substrate;
wherein the coating layer includes copper alloy portions derived from precipitation-hardening copper alloy particles and hard particle portions which are harder than the copper alloy portions;
the hard particle portions are derived from hard particles;
the portions bond with each other via an interface;
each of the hard particle portions has a non-spherical shape;
an aspect ratio of the hard particle portions is 1.3 or more in a median value; and
an average particle size of the copper alloy particles and the hard particles are within a range of 15.8 μm to 40 μm.

11. A method for manufacturing a laminate, the laminate comprising a base substrate and a coating layer formed on the base substrate, wherein the coating layer includes copper alloy portions derived from precipitation-hardening copper alloy particles and hard particle portions which are harder than the copper alloy portions, the hard particle portions are derived from hard particles, the portions bond with each other via an interface, each of the hard particle portions has a non-spherical shape, an aspect ratio of the hard particle portions is 1.3 or more in a median value, and an average particle size of the copper alloy particles and the hard particles are within a range of 15.8 μm to 40 μm the method comprising:
a step of spraying a mixture in a non-molten state including precipitation-hardening copper alloy particles and hard particles having a non-spherical shape, and being harder than the copper alloy particles, onto a base substrate to form a coating layer on the base substrate.

12. The method for manufacturing the laminate according to claim 11, wherein the hard particles comprise at least one type of hard particle selected from the group consisting of iron-based alloy particles, cobalt-based alloy particles, chromium-based alloy particles, nickel-based alloy particles, molybdenum-based alloy particles or ceramic-based particles.

13. The method for manufacturing the laminate according to claim 11, wherein, when the mixture is sprayed onto the base substrate, the mixture is sprayed onto the base substrate at such a speed that makes the copper alloy particles be sprayed onto the base substrate to form at least one plastically deformed portion in at least one of the base substrate or the coating layer.

14. The method for manufacturing the laminate according to claim 11, wherein each of the copper alloy particles is in a supersaturated solid solution state.

15. The method for manufacturing the laminate according to claim 11, wherein each of the copper alloy particles is a rapid solidified particle.

16. The method for manufacturing the laminate according to claim 11, wherein each of the hard particles is a particle manufactured by water atomization.

17. The method for manufacturing the laminate according to claim 11, wherein a grain size of the copper alloy particles and a grain size of the hard particles are equal to or less than 150 μm.

18. The method for manufacturing the laminate according to claim 11, wherein a grain size of the copper alloy particles and a grain size of the hard particles are 75 μm or less.

19. The method for manufacturing the laminate according to claim 11, wherein an average particle size of the copper alloy particles is smaller than an average particle size of the hard particles.

* * * * *